(12) United States Patent
Hirata et al.

(10) Patent No.: US 11,079,636 B2
(45) Date of Patent: Aug. 3, 2021

(54) ACTIVE MATRIX SUBSTRATE, LIQUID CRYSTAL DISPLAY DEVICE WITH TOUCH SENSOR USING ACTIVE MATRIX SUBSTRATE, AND METHOD FOR MANUFACTURING ACTIVE MATRIX SUBSTRATE

(71) Applicant: Sharp Kabushiki Kaisha, Sakai (JP)

(72) Inventors: Yoshiharu Hirata, Sakai (JP); Yoshihito Hara, Sakai (JP); Hideki Kitagawa, Sakai (JP); Tatsuya Kawasaki, Sakai (JP); Masaki Maeda, Sakai (JP); Teruyuki Ueda, Sakai (JP); Yoshimasa Chikama, Sakai (JP); Hajime Imai, Sakai (JP); Tohru Daitoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/075,750

(22) Filed: Oct. 21, 2020

(65) Prior Publication Data
US 2021/0124220 A1 Apr. 29, 2021

Related U.S. Application Data

(60) Provisional application No. 62/925,825, filed on Oct. 25, 2019.

(51) Int. Cl.
*G02F 1/1343* (2006.01)
*G02F 1/1333* (2006.01)
(Continued)

(52) U.S. Cl.
CPC ...... *G02F 1/134309* (2013.01); *G02F 1/1337* (2013.01); *G02F 1/1368* (2013.01);
(Continued)

(58) Field of Classification Search
CPC ......... G02F 1/136213; G02F 1/134372; G02F 1/134363; G02F 1/13338; G06F 3/041;
(Continued)

(56) References Cited

U.S. PATENT DOCUMENTS

| 2012/0138922 | A1 | 6/2012 | Yamazaki et al. |
| 2013/0320334 | A1 | 12/2013 | Yamazaki et al. |
| 2014/0286076 | A1 | 9/2014 | Aoki et al. |
| 2015/0309634 | A1* | 10/2015 | Lee ...................... G06F 3/0412 345/173 |

(Continued)

FOREIGN PATENT DOCUMENTS

| JP | 2009-223267 A | 10/2009 |
| JP | 2012-134475 A | 7/2012 |

(Continued)

*Primary Examiner* — Mariam Qureshi
(74) *Attorney, Agent, or Firm* — Keating & Bennett, LLP

(57) ABSTRACT

An active matrix substrate includes TFTs, an interlayer insulating layer, a common electrode, a first dielectric layer, pixel electrodes, a second dielectric layer, and touch wirings, in which each of the pixel electrodes at least partially overlaps the common electrode via the first dielectric layer, so that an auxiliary capacitance including each of the pixel electrodes, the common electrode, and the first dielectric layer is formed, the touch sensor electrodes include a first electrode, the touch wirings include a first wiring and a second wiring in the touch sensor electrodes, the second wiring extends to the other electrode across the first electrode when viewed from a normal direction, and a portion of the second wiring overlaps the first electrode via the first and the second dielectric layers, so that a touch wiring capacitance including the second wiring, the first electrode, the first and the second dielectric layers is formed.

15 Claims, 29 Drawing Sheets

(51) Int. Cl.
  *G02F 1/1362* (2006.01)
  *G02F 1/1368* (2006.01)
  *G02F 1/1337* (2006.01)
  *G06F 3/041* (2006.01)

(52) U.S. Cl.
  CPC ...... *G02F 1/13338* (2013.01); *G02F 1/13439* (2013.01); *G02F 1/133345* (2013.01); *G02F 1/136213* (2013.01); *G02F 1/136227* (2013.01); *G06F 3/0412* (2013.01); *G02F 2201/121* (2013.01); *G06F 2203/04103* (2013.01)

(58) Field of Classification Search
  CPC ............ G06F 3/0412; G06F 2203/041; G06F 2203/04103; G06F 2203/04112; B32B 2457/208
  See application file for complete search history.

(56) References Cited

U.S. PATENT DOCUMENTS

| | | |
|---|---|---|
| 2016/0187690 A1 | 6/2016 | Nam et al. |
| 2016/0349559 A1* | 12/2016 | Woo ................. G06F 3/0412 |
| 2018/0004322 A1 | 1/2018 | Nakanishi |
| 2018/0090515 A1* | 3/2018 | Sasaki ................. H01L 27/124 |
| 2019/0179440 A1* | 6/2019 | Beak ................. G02F 1/134309 |
| 2019/0339557 A1 | 11/2019 | Tominaga et al. |
| 2021/0004106 A1* | 1/2021 | Wu ................. G06F 3/0443 |

FOREIGN PATENT DOCUMENTS

| | | |
|---|---|---|
| JP | 2014-007399 A | 1/2014 |
| JP | 2014-209727 A | 11/2014 |
| JP | 2016-126336 A | 7/2016 |
| JP | 2018-005484 A | 1/2018 |
| WO | 2017/126603 A1 | 7/2017 |
| WO | 2018/092758 A1 | 5/2018 |

* cited by examiner

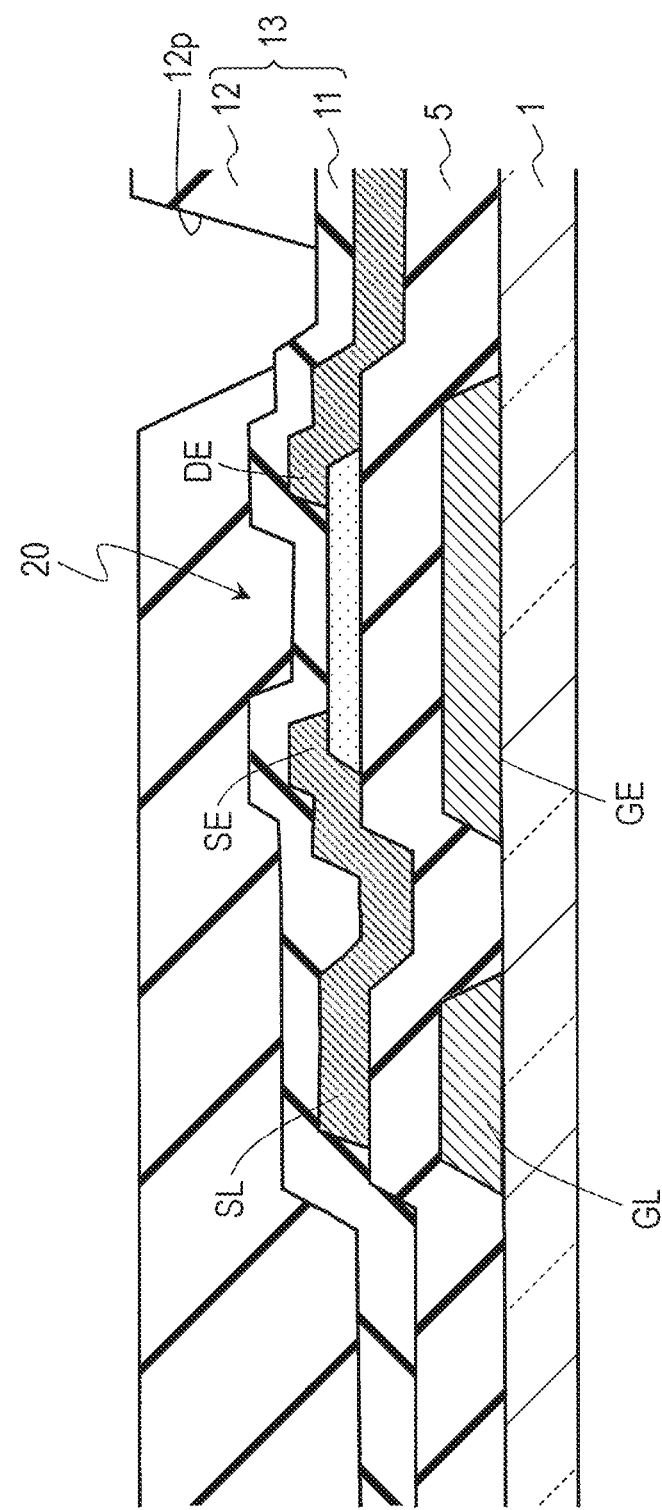

FIG. 8

| STEP 1<br>GATE METAL LAYER | CONDUCTIVE FILM FOR GATE DEPOSITION |
| --- | --- |
| | PHOTOLITHOGRAPHY STEP |
| | CONDUCTIVE FILM FOR GATE ETCHING |
| STEP 2<br>GATE INSULATING LAYER | GATE INSULATING LAYER FORMATION |
| STEP 3<br>OXIDE SEMICONDUCTOR LAYER | OXIDE SEMICONDUCTOR LAYER DEPOSITION |
| | PHOTOLITHOGRAPHY STEP |
| | OXIDE SEMICONDUCTOR FILM ETCHING |
| STEP 4<br>SOURCE METAL LAYER | CONDUCTIVE FILM FOR SOURCE DEPOSITION |
| | PHOTOLITHOGRAPHY STEP |
| | CONDUCTIVE FILM FOR SOURCE ETCHING |
| STEP 5<br>INTERLAYER INSULATING LAYER | INORGANIC INSULATING LAYER DEPOSITION |
| | ORGANIC INSULATING LAYER FORMATION (PHOTOLITHOGRAPHY STEP) |
| | ANNEALING |
| STEP 6<br>COMMON ELECTRODE | FIRST TRANSPARENT CONDUCTIVE FILM DEPOSITION |
| | PHOTOLITHOGRAPHY STEP |
| | FIRST TRANSPARENT CONDUCTIVE FILM ETCHING |
| STEP 7<br>FIRST DIELECTRIC LAYER | FIRST DIELECTRIC LAYER DEPOSITION |
| | PHOTOLITHOGRAPHY STEP |
| | FIRST DIELECTRIC LAYER/ INORGANIC INSULATING LAYER ETCHING |
| STEP 8<br>PIXEL ELECTRODE | SECOND TRANSPARENT CONDUCTIVE FILM DEPOSITION |
| | PHOTOLITHOGRAPHY STEP |
| | SECOND TRANSPARENT CONDUCTIVE FILM ETCHING |
| STEP 9<br>SECOND DIELECTRIC LAYER | SECOND DIELECTRIC LAYER DEPOSITION |
| | PHOTOLITHOGRAPHY STEP |
| | SECOND DIELECTRIC LAYER/ FIRST DIELECTRIC LAYER ETCHING |
| STEP 10<br>TOUCH WIRING LAYER | CONDUCTIVE FILM FOR TOUCH WIRING DEPOSITION |
| | PHOTOLITHOGRAPHY STEP |
| | CONDUCTIVE FILM FOR TOUCH WIRING ETCHING |

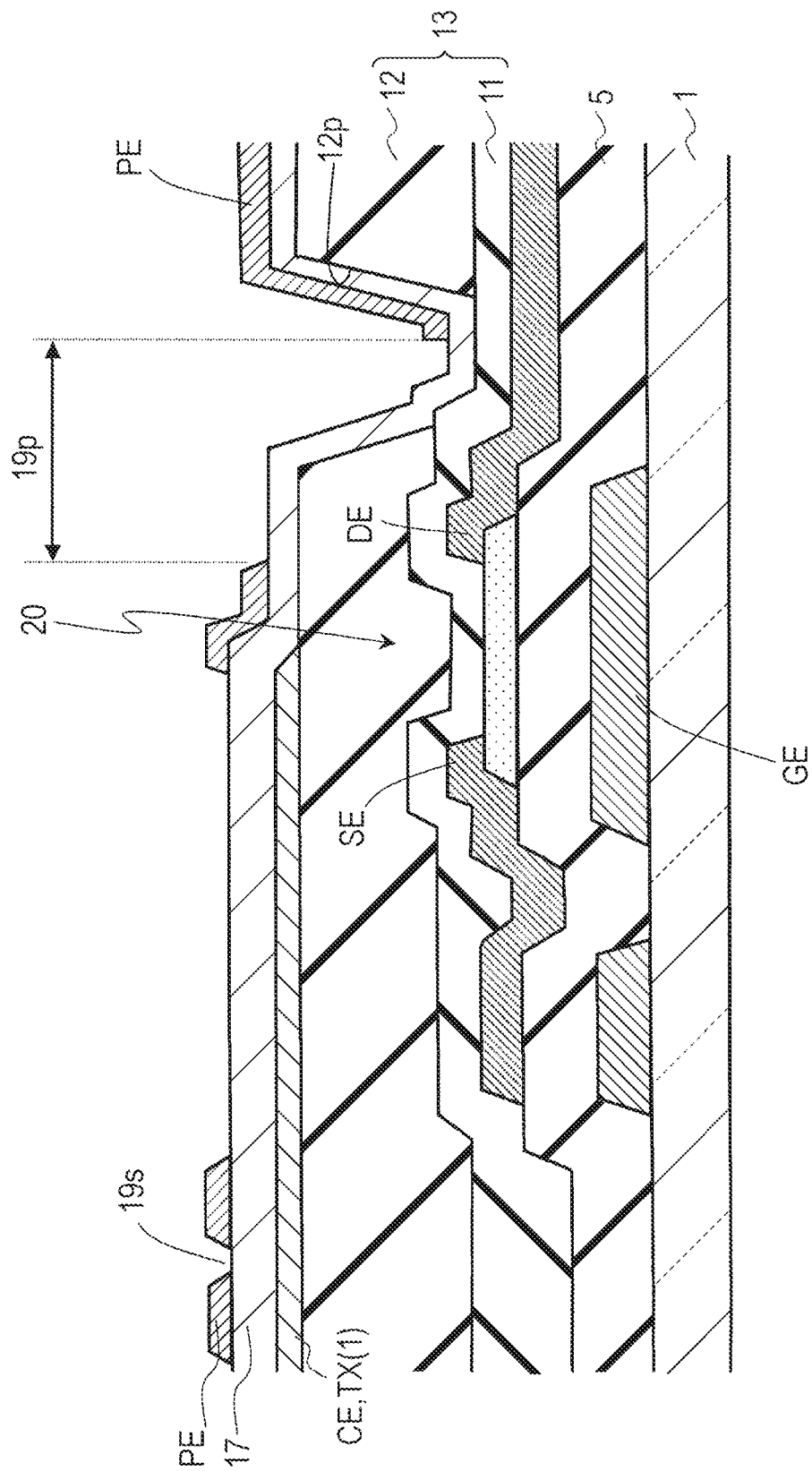

FIG. 12

| STEP 1<br>GATE METAL LAYER | CONDUCTIVE FILM FOR GATE DEPOSITION |
| --- | --- |
| | PHOTOLITHOGRAPHY STEP |
| | CONDUCTIVE FILM FOR GATE ETCHING |
| STEP 2<br>GATE INSULATING LAYER | GATE INSULATING LAYER FORMATION |
| STEP 3<br>OXIDE SEMICONDUCTOR LAYER | OXIDE SEMICONDUCTOR LAYER DEPOSITION |
| | PHOTOLITHOGRAPHY STEP |
| | OXIDE SEMICONDUCTOR FILM ETCHING |
| STEP 4<br>SOURCE METAL LAYER | CONDUCTIVE FILM FOR SOURCE DEPOSITION |
| | PHOTOLITHOGRAPHY STEP |
| | CONDUCTIVE FILM FOR SOURCE ETCHING |
| STEP 5<br>INTERLAYER INSULATING LAYER | INORGANIC INSULATING LAYER DEPOSITION |
| | ORGANIC INSULATING LAYER FORMATION (PHOTOLITHOGRAPHY STEP) |
| | ANNEALING |
| STEP 6<br>COMMON ELECTRODE | FIRST TRANSPARENT CONDUCTIVE FILM DEPOSITION |
| | PHOTOLITHOGRAPHY STEP |
| | FIRST TRANSPARENT CONDUCTIVE FILM ETCHING |
| STEP 7-2<br>FIRST DIELECTRIC LAYER | FIRST DIELECTRIC LAYER DEPOSITION |
| STEP 8-2<br>PIXEL ELECTRODE | SECOND TRANSPARENT CONDUCTIVE FILM DEPOSITION |
| | PHOTOLITHOGRAPHY STEP |
| | SECOND TRANSPARENT CONDUCTIVE FILM ETCHING |
| STEP 9-2<br>SECOND DIELECTRIC LAYER | SECOND DIELECTRIC LAYER DEPOSITION |
| | PHOTOLITHOGRAPHY STEP |
| | SECOND DIELECTRIC LAYER/FIRST DIELECTRIC LAYER/INORGANIC INSULATING LAYER ETCHING |
| STEP 10-2<br>TOUCH WIRING LAYER | CONDUCTIVE FILM FOR TOUCH WIRING DEPOSITION |
| | PHOTOLITHOGRAPHY STEP |
| | CONDUCTIVE FILM FOR TOUCH WIRING ETCHING |

ACTIVE MATRIX SUBSTRATE, LIQUID CRYSTAL DISPLAY DEVICE WITH TOUCH SENSOR USING ACTIVE MATRIX SUBSTRATE, AND METHOD FOR MANUFACTURING ACTIVE MATRIX SUBSTRATE

BACKGROUND

1. Field

The present disclosure relates to an active matrix substrate, a liquid crystal display device with a touch sensor using the active matrix substrate, and a method for manufacturing the active matrix substrate.

2. Description of the Related Art

In a display device provided with an active matrix substrate, a pixel electrode and a switching element are provided for each pixel. As the switching element, for example, a thin film transistor (hereinafter, "TFT") is used. It has been proposed to use an oxide semiconductor instead of amorphous silicon or polycrystalline silicon as a material for an active layer of the TFT. In this specification, a portion of the active matrix substrate corresponding to the pixel of the display device may be referred to as a "pixel region" or a "pixel".

As an operation mode of the active matrix type display device, a lateral electric field type mode such as a fringe field switching (FFS) mode may be adopted. In the lateral electric field type, a pair of electrodes (pixel electrode and common electrode) are provided on the active matrix substrate and an electric field is applied to liquid crystal molecules in a direction parallel to a substrate surface (lateral direction). In the FFS mode, at least a portion of the pixel electrode of each of the pixels is disposed so as to overlap the common electrode via a dielectric layer. Therefore, a capacitance is formed in a portion where the pixel electrode and the common electrode overlap each other. This capacitance can have a function as an auxiliary capacitance (hereinafter, referred to as "transparent auxiliary capacitance") in the display device.

In a case where a touch sensor function is incorporated in a lateral electric field type display device, a common electrode provided on the active matrix substrate is divided into a plurality of segments, and each of the segments can function as an electrode for touch sensor (hereinafter, "touch sensor electrode"). Each of the touch sensor electrodes is electrically connected to a corresponding touch wiring (for driving or detecting the touch sensor). The structure of such an active matrix substrate is disclosed in Japanese Unexamined Patent Application Publication No. 2016-126336, for example.

However, as a result of examination by the present inventor, in the active matrix substrate having the above-described structure, there is a possibility that the accuracy of sensing may be reduced due to high definition.

For example, in the active matrix substrate disclosed in Japanese Unexamined Patent Application Publication No. 2016-126336, a pixel electrode and a touch wiring are provided on a touch sensor electrode that also serves as a common electrode via a dielectric layer. The pixel electrode and the touch wiring are disposed on an upper surface of the dielectric layer with an interval. When viewed from a normal direction of a substrate 1, a portion of the touch wirings extend to the corresponding touch sensor electrodes across the other touch sensor electrodes. A capacitance (hereinafter, referred to as "touch wiring capacitance".) is formed in a portion where the touch wiring and the other touch sensor electrode overlap each other by the touch wiring, the other touch sensor electrode, and the dielectric layer located therebetween. Therefore, the load of the touch wiring capacitance may deteriorate the signal output from the touch wiring, which may reduce the sensing performance. On the other hand, it is conceivable to increase the thickness of the dielectric layer in order to reduce the sensor wiring capacitance. Then, since the capacitance (transparent auxiliary capacitance) formed in the overlapping portion of the pixel electrode and the common electrode also decreases, there is a possibility that the display performance may reduce.

As described above, there is a trade-off relationship between the sensing performance and the display performance, and it may be difficult to enhance the sensing performance while ensuring high display performance.

It is desirable to provide an active matrix substrate capable of enhancing sensing performance while ensuring high display performance, and a liquid crystal display device with a touch sensor using such an active matrix substrate.

SUMMARY

According to an aspect of the disclosure, there is provided an active matrix substrate described in the following items.

Item 1

An active matrix substrate includes a substrate; a plurality of TFTs supported on the substrate; an interlayer insulating layer that covers the plurality of TFTs; a common electrode disposed on the interlayer insulating layer and divided into a plurality of segments each of which functions as a touch sensor electrode; a first dielectric layer that covers the common electrode; a plurality of pixel electrodes disposed on the first dielectric layer, each of which is electrically connected to any one of the plurality of TFTs; a second dielectric layer that covers the plurality of pixel electrodes; and a plurality of touch wirings disposed on the second dielectric layer, each of which is electrically connected to any one of the plurality of touch sensor electrodes, in which each of the pixel electrodes at least partially overlaps the common electrode via the first dielectric layer, so that an auxiliary capacitance including each of the pixel electrodes, the common electrode, and the first dielectric layer is formed, the plurality of touch sensor electrodes include a first electrode, the plurality of touch wirings include a first wiring electrically connected to the first electrode and a second wiring electrically connected to another electrode other than the first electrode in the plurality of touch sensor electrodes, the second wiring extends to the other electrode across the first electrode when viewed from a normal direction of the substrate, and a portion of the second wiring overlaps the first electrode via the first dielectric layer and the second dielectric layer, so that a touch wiring capacitance including the second wiring, the first electrode, the first dielectric layer, and the second dielectric layer is formed.

Item 2

A liquid crystal display device with a touch sensor, the device including the active matrix substrate according to Item 1; a counter substrate disposed so as to face the active matrix substrate; and a liquid crystal layer provided between the active matrix substrate and the counter substrate, in which the active matrix substrate includes an alignment film disposed on the second dielectric layer, and the alignment film is in contact with the liquid crystal layer.

Item 3

A method for manufacturing an active matrix substrate, the method including (a) forming a plurality of TFTs on a main surface of a substrate; (b) forming an interlayer insulating layer that covers the plurality of TFTs; (c) forming a common electrode on the interlayer insulating layer, the common electrode being divided into a plurality of segments each of which functions as a touch sensor electrode; (d) forming a first dielectric layer that covers the common electrode; (e) forming a plurality of pixel contact holes each of which exposes a portion of a drain electrode of any one of the plurality of TFTs in the first dielectric layer and the interlayer insulating layer; (f) forming a plurality of pixel electrodes on the first dielectric layer, each of the pixel electrodes being in contact with the portion of the drain electrode of any one of the TFTs in each of the pixel contact holes; (g) forming a second dielectric layer that covers the plurality of pixel electrodes; (h) forming a plurality of sensor contact holes each of which exposes a portion of any one of the plurality of touch sensor electrodes in the first dielectric layer and the second dielectric layer; and (i) forming a plurality of touch wirings on the second dielectric layer, each of the touch wirings being in contact with the portion of any one of the touch sensor electrodes in each of the sensor contact holes.

Item 4

A method for manufacturing an active matrix substrate, the method including (A) forming a plurality of TFTs on a main surface of a substrate; (B) forming an interlayer insulating layer including an inorganic insulating layer so as to cover the plurality of TFTs; (C) forming a common electrode on the interlayer insulating layer, the common electrode being divided into a plurality of segments each of which functions as a touch sensor electrode; (D) forming a first dielectric layer that covers the common electrode; (E) forming a plurality of pixel electrodes on the first dielectric layer, each of the pixel electrodes having a second opening portion or a notched portion exposing the first dielectric layer, and the second opening portion or the notched portion overlapping any one of drain electrodes of the plurality of TFTs when viewed from a normal direction of the substrate; (F) forming a second dielectric layer that covers the plurality of pixel electrodes; (G) forming a plurality of pixel contact holes each of which exposes a portion of the drain electrode of any one of the TFTs, each of the pixel contact holes including a first opening portion formed in the first dielectric layer and the interlayer insulating layer, a second opening portion formed in each of the pixel electrodes, and a third opening portion formed in the second dielectric layer, and the third opening portion exposing a portion of each of the pixel electrodes; (H) forming a plurality of sensor contact holes each of which exposes a portion of any one of the plurality of touch sensor electrodes in the first dielectric layer and the second dielectric layer; and (I) forming a plurality of touch wirings and a plurality of connection electrodes on the second dielectric layer, each of the touch wirings being in contact with the portion of any one of the touch sensor electrodes in each of the sensor contact holes, and each of the connection electrodes being in contact with the portion of the drain electrode in each of the pixel contact holes.

BRIEF DESCRIPTION OF THE DRAWINGS

FIG. 7A is a step sectional view illustrating a method for manufacturing the active matrix substrate;

FIG. 8 is a flowchart illustrating an example of the method for manufacturing the active matrix substrate;

FIG. 11B is a step sectional view illustrating the method for manufacturing the active matrix substrate;

FIG. 12 is a flowchart illustrating an example of the method for manufacturing the active matrix substrate;

DESCRIPTION OF THE EMBODIMENTS

First Embodiment

Figure 1A:
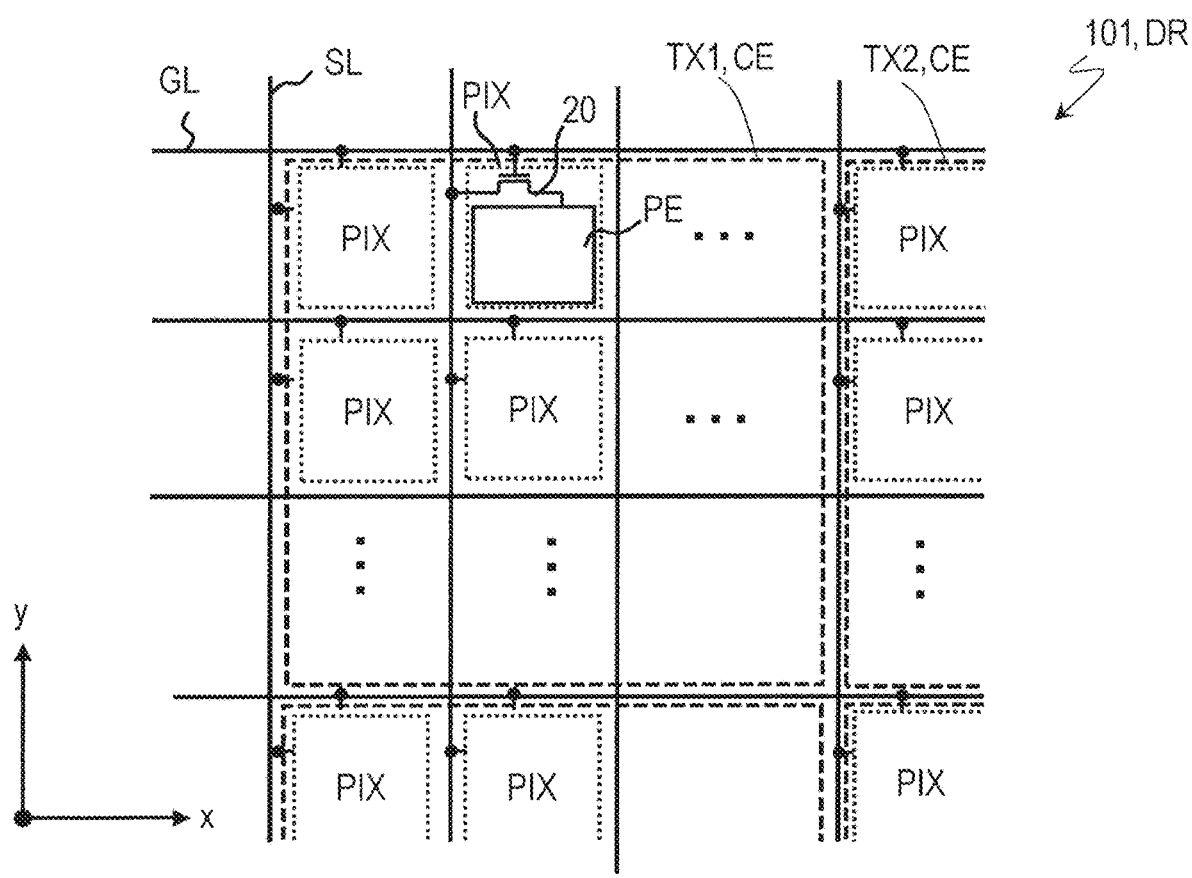
FIG. 1A is a plan view of an active matrix substrate according to a first embodiment.

Hereinafter, an active matrix substrate and a display device with a touch sensor (hereinafter, "touch panel") according to the embodiments of the present disclosure will be described more specifically. In the following drawings, components having substantially the same function are designated by common reference numerals, and the description thereof may be omitted.

Overall Structure Active Matrix Substrate 101

First, an outline of the active matrix substrate 101 according to the present embodiment will be described with reference to the drawings. The active matrix substrate 101 can be used in, for example, an in-cell touch panel using a liquid crystal display panel of a lateral electric field mode (for example, fringe field switching (FFS) mode)). The touch panel may include, for example, a mutual capacitance type touch sensor or a self capacitance type touch sensor.

Figure 1B:
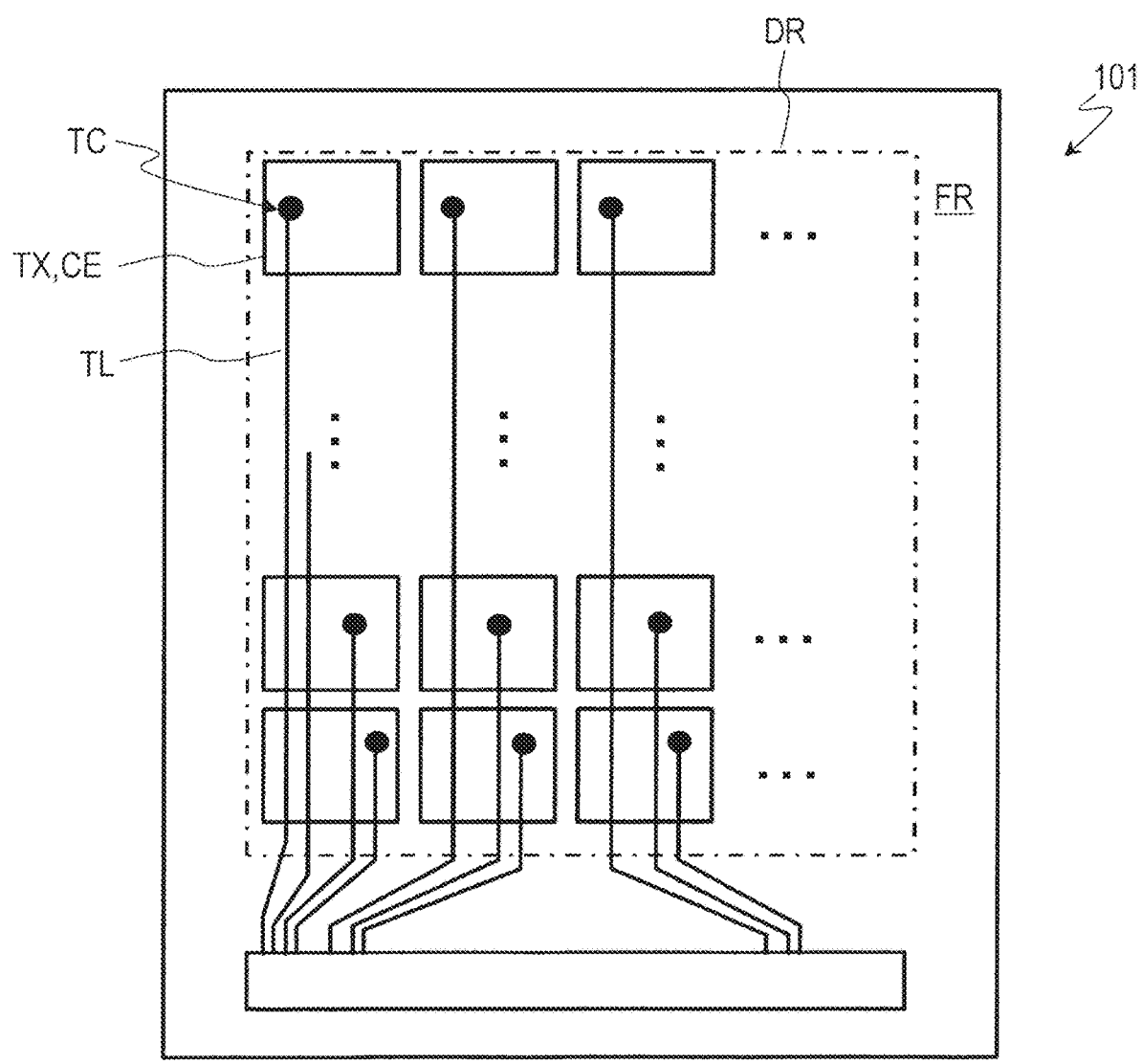
FIG. 1B is a plan view illustrating an arrangement relationship between touch sensor electrodes and touch wirings in the active matrix substrate according to the first embodiment.

FIG. 1A is a schematic plan view of the active matrix substrate 101 according to the first embodiment, and FIG. 1B is a schematic plan view illustrating an arrangement relationship between touch sensor electrodes and touch wirings in the active matrix substrate 101.

The active matrix substrate 101 has a display region DR and a non-display region (peripheral region) FR located around the display region DR.

As illustrated in FIG. 1A, the display region DR includes a plurality of gate bus lines GL extending substantially parallel to the x direction (first direction), a plurality of source bus lines SL extending substantially parallel to the y direction (second direction), and a plurality of pixel regions PIX disposed two-dimensionally in the x direction and the y direction. The y direction is a direction intersecting the x direction and may be orthogonal to the x direction. The "pixel region PIX" is a region corresponding to each of the pixels of the display device. In this example, each of the pixel regions PIX is defined by the gate bus line GL and the source bus line SL.

Each of the pixel regions PIX has a TFT 20 and a pixel electrode PE. The gate electrode of the TFT 20 is electrically connected to a corresponding gate bus line GL. The source electrode of the TFT 20 is electrically connected to the corresponding source bus line SL, and a drain electrode is electrically connected to the pixel electrode PE.

The common electrode CE is also provided on the active matrix substrate 101. Here, the common electrode CE is divided into a plurality of segments TX1 and TX2. Each of the segments TX1 and TX2 functions as a touch sensor electrode. In the example illustrated in FIG. 1A, each of the touch sensor electrodes TX1 and TX2 (hereinafter, may be collectively referred to as "touch sensor electrode TX") is provided corresponding to the plurality of pixel regions PIX.

As illustrated in FIG. 1B, the active matrix substrate 101 has a plurality of touch wirings TL. Each of the touch sensor electrodes TX is electrically connected to the corresponding touch wiring TL. A connection portion TC between the touch sensor electrode TX and the touch wiring TL is referred to as a "touch wiring contact portion".

The touch wiring TL is connected to a touch drive portion TD provided in the non-display region FR. For example, the touch drive portion TD is configured to switch a display mode in which the plurality of touch sensor electrodes TX function as the common electrode CE and a touch detection mode in which the plurality of touch sensor electrodes TX function as the touch sensor electrode TX in a time division manner. The touch drive portion TD applies a common signal to the touch sensor electrode TX (common electrode CE) via the touch wiring TL in the display mode, for example. On the other hand, the touch drive portion TD applies a touch drive signal to the touch sensor electrode TX via the touch wiring TL in the touch detection mode.

When viewed from a normal direction of the substrate 1, the plurality of touch wirings TL may extend in the y direction, for example. A portion of the touch wirings TL extend to the corresponding touch sensor electrode TX across the other one or a plurality of touch sensor electrodes TX.

Although not illustrated, in the non-display region FR of the active matrix substrate 101, in addition to the touch drive portion TD, a peripheral circuit including a drive circuit such as a gate driver for supplying a scanning signal to the TFT 20 via the gate bus line GL and a source driver for supplying a pixel signal to the TFT 20 via the source bus line SL is provided. These drive circuits may be mounted on, for example, the active matrix substrate 101, or may be integrally (monolithically) formed. A semiconductor chip including a portion or all of the drive circuits may be mounted on the non-display region FR.

Although the example in which the touch panel is provided with the self capacitance type touch sensor is described above, the touch panel may be provided with the mutual capacitance type touch sensor instead. In this case, another electrode for touch sensor may be provided on a counter substrate disposed to face the active matrix substrate 101 with a liquid crystal layer interposed therebetween. For example, the touch sensor electrode TX may extend in one direction (for example, x direction), an electrode for touch sensor provided on the counter substrate may extend in the other direction (for example, y direction), and a change in capacitance of a portion where these electrodes intersect each other (touch detection unit) may be detected. Specific structures and driving methods of the mutual capacitance type and self capacitance type touch sensors are described in, for example, Japanese Unexamined Patent Application Publication No. 2018-5484, International Application No. 2018/092758, International Application No. 2017/126603, and Japanese Unexamined Patent Application Publication No. 2016-126336 and the like, and are well known, so detailed description thereof will be omitted. For reference, the entire disclosures of Japanese Unexamined Patent Application Publication No. 2018-5484, International Application No. 2018/092758, International Application No. 2017/126603, and Japanese Unexamined Patent Application Publication No. 2016-126336 are incorporated herein.

In this specification, regardless of whether the touch sensor formed on the active matrix substrate 101 is a self capacitance type or a mutual capacitance type, an electrode for touch sensor disposed on the active matrix substrate 101 side is simply referred to as "touch sensor electrode TX", and the wiring for the touch sensor electrically connected to the touch sensor electrode TX is referred to as a "touch wiring".

Structure of Pixel Region PIX of Active Matrix Substrate 101

Next, the structure of the pixel region PIX of the active matrix substrate 101 will be described.

Figure 2A:
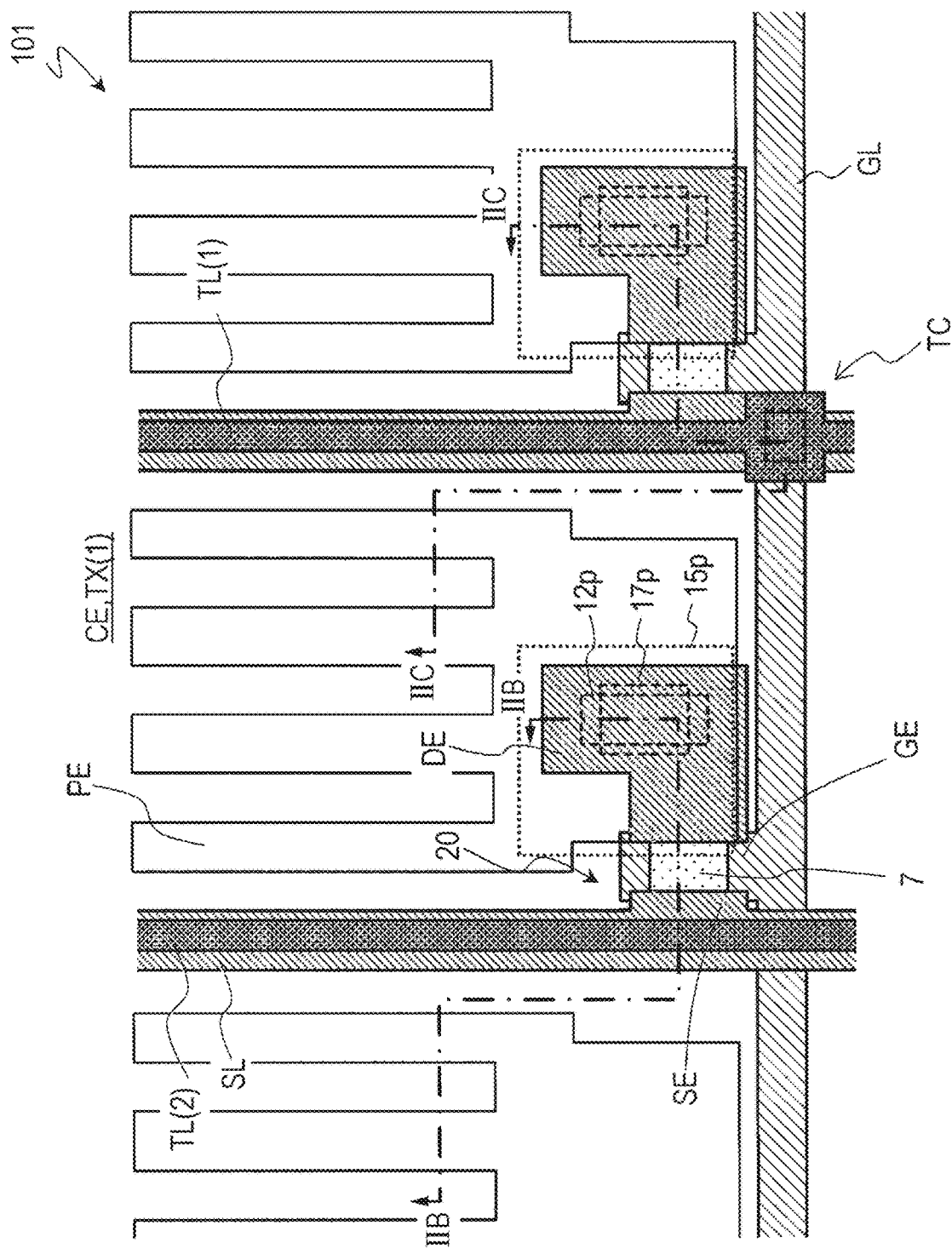
FIG. 2A is a plan view illustrating a pixel region of the active matrix substrate.
Figure 2B:
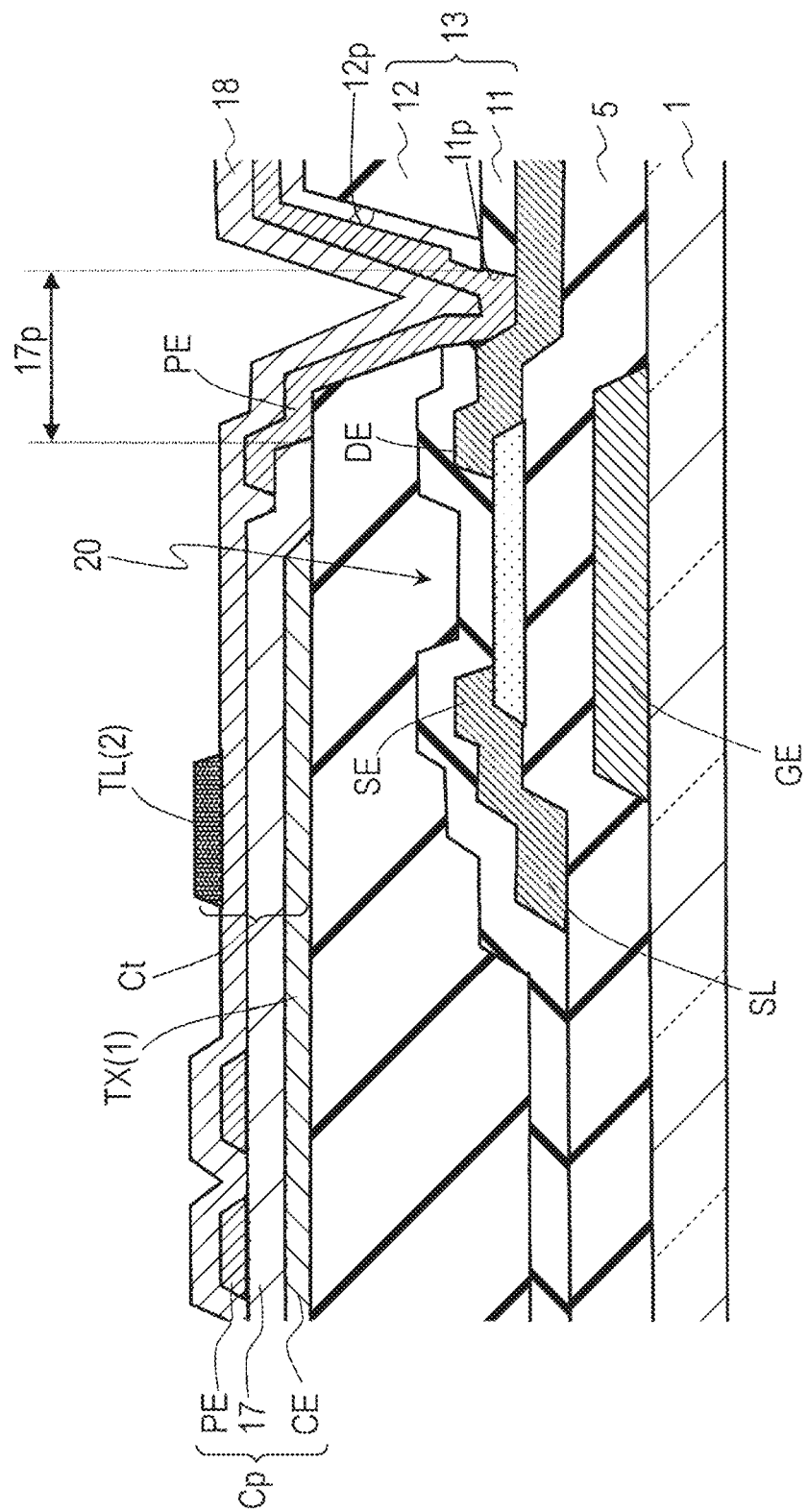
FIG. 2B is a cross-sectional view taken along line IIB-IIB illustrated in FIG. 2A in the pixel region of the active matrix substrate.
Figure 2C:
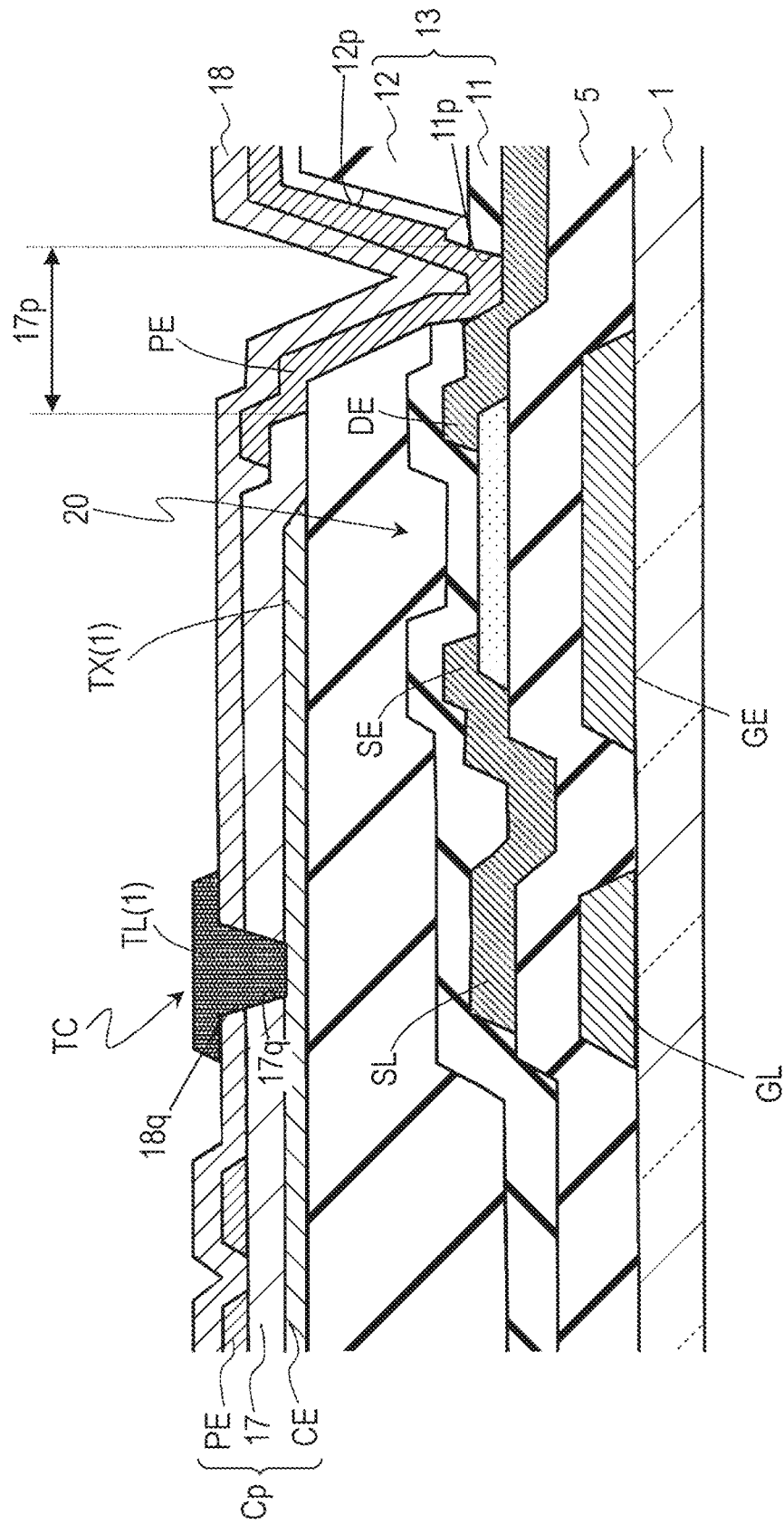
FIG. 2C is a cross-sectional view taken along line IIC-IIC illustrated in FIG. 2A in the pixel region of the active matrix substrate.

FIG. 2A is an enlarged plan view illustrating a portion of the display region DR of the active matrix substrate 101. FIGS. 2B and 2C are cross-sectional views taken along lines IIB-IIB and IIC-IIC illustrated in FIG. 2A, respectively.

The display region DR of the active matrix substrate 101 has a gate bus line GL extending in the x direction, a source bus line SL extending in the y direction, and a plurality of pixel regions PIX arranged in a matrix in the x direction and the y direction.

Each of the pixel regions PIX includes a TFT 20 supported on the substrate 1, a pixel electrode PE, and a common electrode CE. Each of the TFTs 20 may be disposed in association with each of the plurality of pixel regions PIX, and a portion of the TFT 20 may be disposed outside the corresponding pixel region PIX.

The TFT 20 includes a gate electrode GE, an oxide semiconductor layer 7, a gate insulating layer 5 disposed between the oxide semiconductor layer 7 and the gate electrode GE, and a source electrode SE and a drain electrode DE electrically connected to the oxide semiconductor layer 7. The gate electrode GE overlaps at least a portion of the oxide semiconductor layer 7 via the gate insulating layer 5.

In this example, the TFT 20 is a bottom gate type oxide semiconductor TFT. The gate electrode GE is disposed between the oxide semiconductor layer 7 and the substrate 1. The gate insulating layer 5 covers the gate electrode GE. The oxide semiconductor layer 7 is disposed on the gate insulating layer 5 so as to overlap the gate electrode GE via the gate insulating layer 5. The source electrode SE and the drain electrode DE may be disposed so as to be in contact with a portion of the upper surface of the oxide semiconductor layer 7, respectively. A region of the oxide semiconductor layer 7, which is located between a portion in contact with the source electrode SE (source contact region) and a portion in contact with the drain electrode DE (drain contact region) and overlaps the gate electrode GE, serves as a "channel region".

The gate electrode GE is electrically connected to the corresponding gate bus line GL, and the source electrode SE is electrically connected to the corresponding source bus line SL. The drain electrode DE is electrically connected to the corresponding pixel electrode PE. A connection portion between the drain electrode DE and the pixel electrode PE is referred to as a "pixel contact portion". The gate electrode GE may be formed in the same layer (gate metal layer) as the gate bus line GL. The gate electrode GE may be a portion of the corresponding gate bus line GL. The source electrode SE and the drain electrode DE may be formed in the same layer (source metal layer) as the source bus line SL. The source electrode SE may be a portion of the corresponding source bus line SL. In this specification, a layer including an electrode and wiring formed using the same conductive film as the gate bus line GL is referred to as a "gate metal layer", and a layer including an electrode and wiring formed using the same conductive film as the source bus line SL is referred to as a "source metal layer".

The TFT 20 is covered with an interlayer insulating layer 13. The interlayer insulating layer 13 may include the organic insulating layer 12. The organic insulating layer 12 may have a thickness (for example, about 1 µm or more) that can function as a flattening film. In this example, the interlayer insulating layer 13 has a laminated structure of an inorganic insulating layer (passivation film) 11 and the organic insulating layer 12 disposed on the inorganic insulating layer 11.

In each of the pixel regions PIX, the common electrode CE is provided on the interlayer insulating layer 13. The common electrode CE is divided (by a slit or the like) into a plurality of segments each of which functions as the touch sensor electrode TX. Each of the touch sensor electrodes TX may be associated with, for example, two or more pixel regions PIX. Each of the touch sensor electrodes TX may be formed over the entire portion of the two or more pixel regions PIX except the pixel contact portion.

The common electrode CE is covered with a first dielectric layer 17. The pixel electrode PE is provided on the first dielectric layer 17. The pixel electrode PE is disposed for each pixel region PIX. Each of the pixel electrodes PE has at least a slit or a notched portion. In the pixel contact portion, each of the pixel electrodes PE is electrically connected to the drain electrode DE in a contact hole (hereinafter, referred to as "pixel contact hole".) formed in the insulating layer (here, the interlayer insulating layer 13 and the first dielectric layer 17) located between the pixel electrode PE and the drain electrode DE. Here, the pixel contact hole includes an opening portion 11p formed in the inorganic insulating layer 11, an opening portion 12p formed in the organic insulating layer 12, and an opening portion 17p formed in the first dielectric layer 17.

The pixel electrode PE is disposed on the first dielectric layer 17 so as to partially overlap the common electrode CE via the first dielectric layer 17. An auxiliary capacitance (transparent auxiliary capacitance) Cp is formed at a portion where the pixel electrode PE and the common electrode CE overlap with each other by the common electrode CE, the pixel electrode PE, and the first dielectric layer 17 located between these electrodes.

The pixel electrode PE and the first dielectric layer 17 are covered with a second dielectric layer 18. A plurality of touch wirings TL are disposed on the second dielectric layer 18. At least one touch wiring TL may be provided for each of the touch sensor electrodes TX. When viewed from the normal direction of the substrate 1, at least a portion of the touch wiring TL extends from the touch drive portion TD (FIG. 1B) provided in the non-display region to the corresponding touch sensor electrode TX across the other touch sensor electrodes TX, and is electrically connected to the corresponding touch sensor electrode TX in the touch wiring contact portion TC. In this specification, a layer including electrodes and wirings formed using the same conductive film as that of the touch wiring TL is referred to as a "touch wiring layer".

A first touch wiring TL(1) for supplying a signal to the first touch sensor electrode TX(1) and a second touch wiring TL(2) for supplying a signal to another touch sensor electrode other than the first touch sensor electrode TX(1) via the second dielectric layer 18 are disposed on one touch sensor electrode TX (hereinafter, referred to as "first touch sensor electrode TX(1)".) illustrated in FIGS. 2A to 2C.

When viewed from the normal direction of the substrate 1, the second touch wiring TL(2) extends to another touch sensor electrode across the first touch sensor electrode TX(1), and is not connected to the first touch sensor electrode TX(1). As illustrated in FIG. 2B, at least a portion of the second touch wiring TL(2) does not overlap the pixel electrode PE and overlaps the first touch sensor electrode TX(1) when viewed from the normal direction of the substrate 1. In a portion where the second touch wiring TL(2) and the first touch sensor electrode TX(1) overlap each other, a touch wiring capacitance Ct is formed by the second touch wiring TL(2), the first touch sensor electrode TX(1), and the dielectric (first dielectric layer 17 and second dielectric layer 18) located therebetween.

As illustrated in FIG. 1B, depending on the position of the touch sensor electrode TX, the touch wiring TL may not pass over the touch sensor electrode TX, or two or more touch wirings TL may pass over the touch sensor electrode TX.

On the other hand, as illustrated in FIG. 2C, the first touch wiring TL(1) is electrically connected to the first touch sensor electrode TX(1) in the contact holes (hereinafter "sensor contact hole") formed in the first dielectric layer 17 and the second dielectric layer 18 at the touch wiring contact portion TC. The sensor contact hole includes an opening portion 17q formed in the first dielectric layer 17 and an opening portion 18q formed in the second dielectric layer 18. The opening portion 17q and the opening portion 18q may be formed by etching using the same mask. In this case, the side surfaces of these opening portions 17q and 18q may be aligned. At least one touch wiring contact portion TC may be provided, or two or more touch wiring contact portions TC may be provided for one touch sensor electrode TX.

As illustrated in FIG. 2A, each of the touch wirings TL may extend above one source bus line SL of the plurality of source bus lines SL along the source bus line SL (in the y direction). The touch wiring contact portion TC may be disposed on an intersection portion of the source bus line SL and the gate bus line GL.

Although not illustrated, the touch wiring TL and the second dielectric layer 18 may be covered with an alignment film (for example, polyimide film) that controls the alignment of the liquid crystal.

Figure 3:
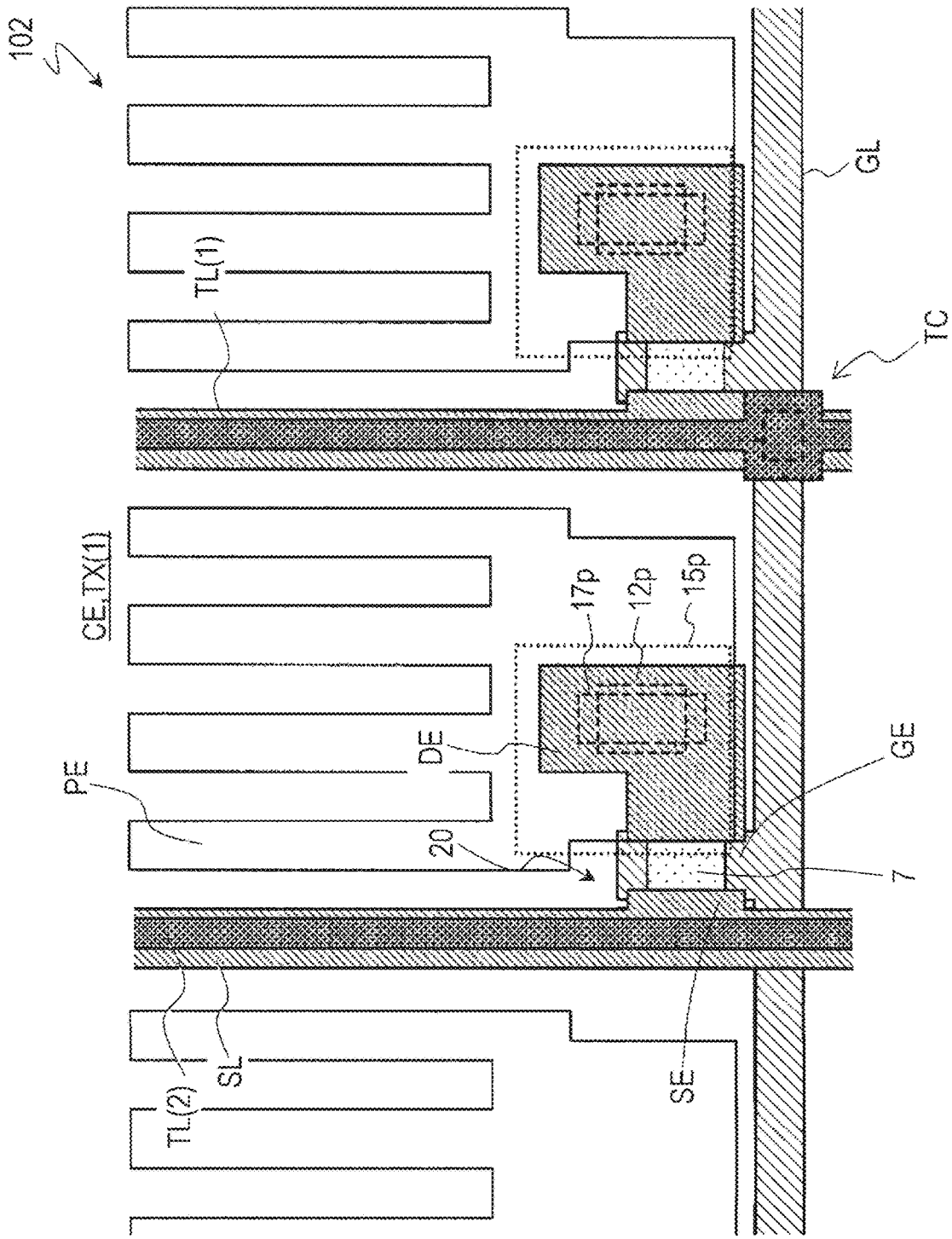
FIG. 3 is a plan view illustrating a pixel region of another active matrix substrate according to the first embodiment.

The configuration of the active matrix substrate according to the present embodiment is not limited to the configuration illustrated in FIGS. 2A to 2C. FIG. 3 is a plan view illustrating a pixel region of another active matrix substrate 102 according to the present embodiment. A cross-sectional view of the active matrix substrate 102 is omitted. In the example illustrated in FIG. 2A, when viewed from the normal direction of the substrate 1, the opening portion 17p extends in the x direction (row direction) across the opening portion 12p, and as illustrated in FIG. 3, the opening portion 17p may extend in the y direction (column direction) across the opening portion 12p.

Configuration of Touch Panel

The active matrix substrate according to the present embodiment can be used for an in-cell touch panel liquid crystal display device (touch panel).

Figure 4:
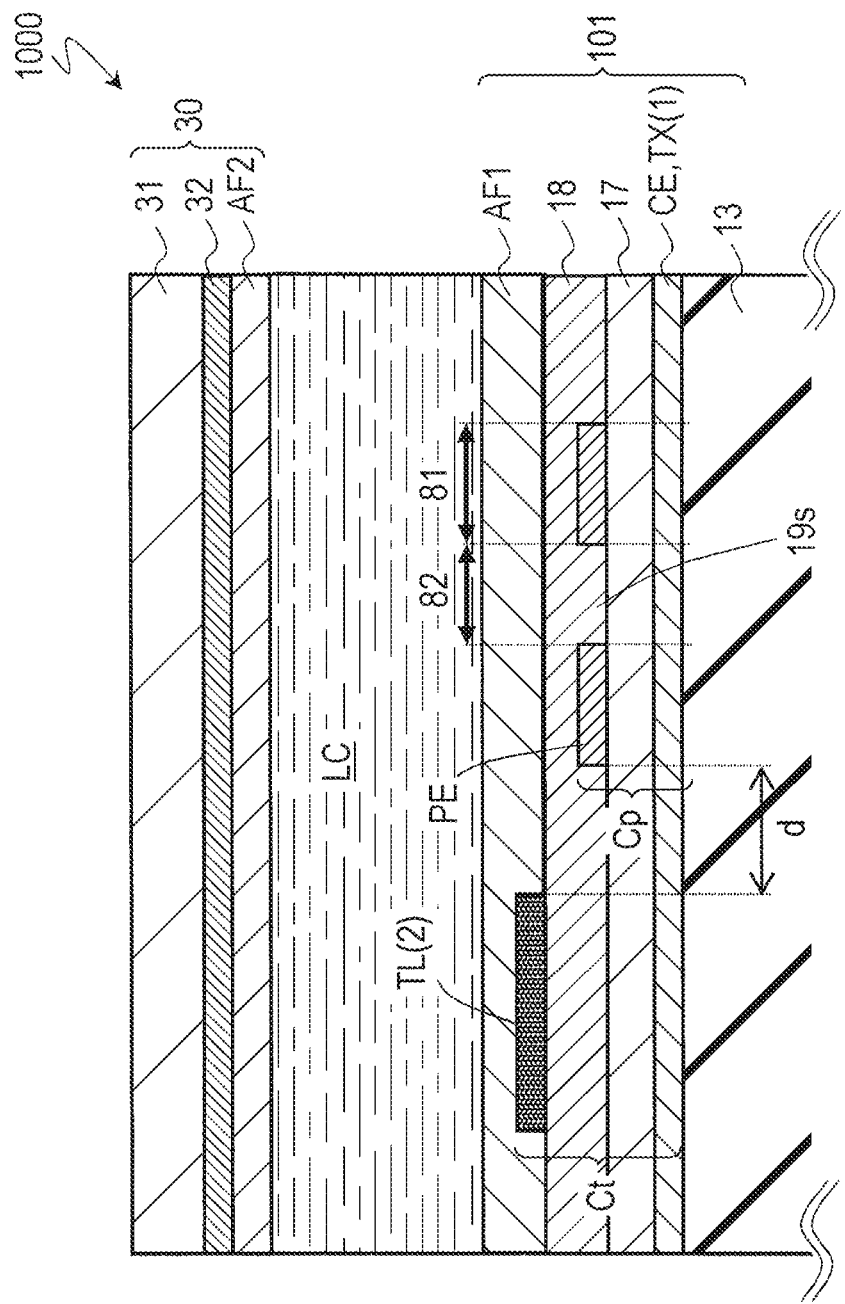
FIG. 4 is a schematic cross-sectional view illustrating a portion of a touch panel using the active matrix substrate according to the first embodiment.

FIG. 4 is a schematic cross-sectional view illustrating a portion of a touch panel 1000 using the active matrix substrate 101 according to the present embodiment.

The touch panel 1000 is provided with the active matrix substrate 101, a counter substrate 30 disposed on the viewer side of the active matrix substrate 101, and a liquid crystal layer LC provided between the active matrix substrate 101 and the counter substrate 30.

As described above, the active matrix substrate 101 includes a TFT (not illustrated) disposed in each pixel region, a common electrode CE disposed on the interlayer insulating layer 13 covering the TFT, a first dielectric layer 17 covering the common electrode CE, a pixel electrode PE disposed on the first dielectric layer 17, a second dielectric layer 18 covering the pixel electrode PE, and a touch wiring TL disposed on the second dielectric layer 18. The pixel electrode PE has a slit 19s in the pixel. The common electrode CE also functions as the touch sensor electrode TX. Here, a cross-section including the first touch sensor electrode TX(1) and the second touch wiring TL(2) electrically connected to the touch sensor electrodes other than the first touch sensor electrode TX(1) is illustrated. On the liquid crystal layer LC side of the active matrix substrate 101, a first alignment film AF1 is formed so as to cover the second dielectric layer 18 and the touch wiring layer. The first alignment film AF1 may be in direct contact with the liquid crystal layer LC.

The counter substrate 30 is provided with a substrate 31 and a color filter layer 32. A second alignment film AF2 is provided on the liquid crystal layer LC side of the color filter layer 32. Although not illustrated, in a case where a mutual capacitance type touch sensor is used, when the touch sensor electrode TX on the active matrix substrate 101 side is a drive electrode, the counter substrate 30 may be provided with a detection electrode of the touch sensor electrode.

Effects of Active Matrix Substrate of Present Embodiment

By using the active matrix substrate according to the present embodiment, it is possible to realize a touch panel that can further improve the sensing performance while maintaining high display performance. The reason will be described below with reference to the drawings.

Figure 6A:
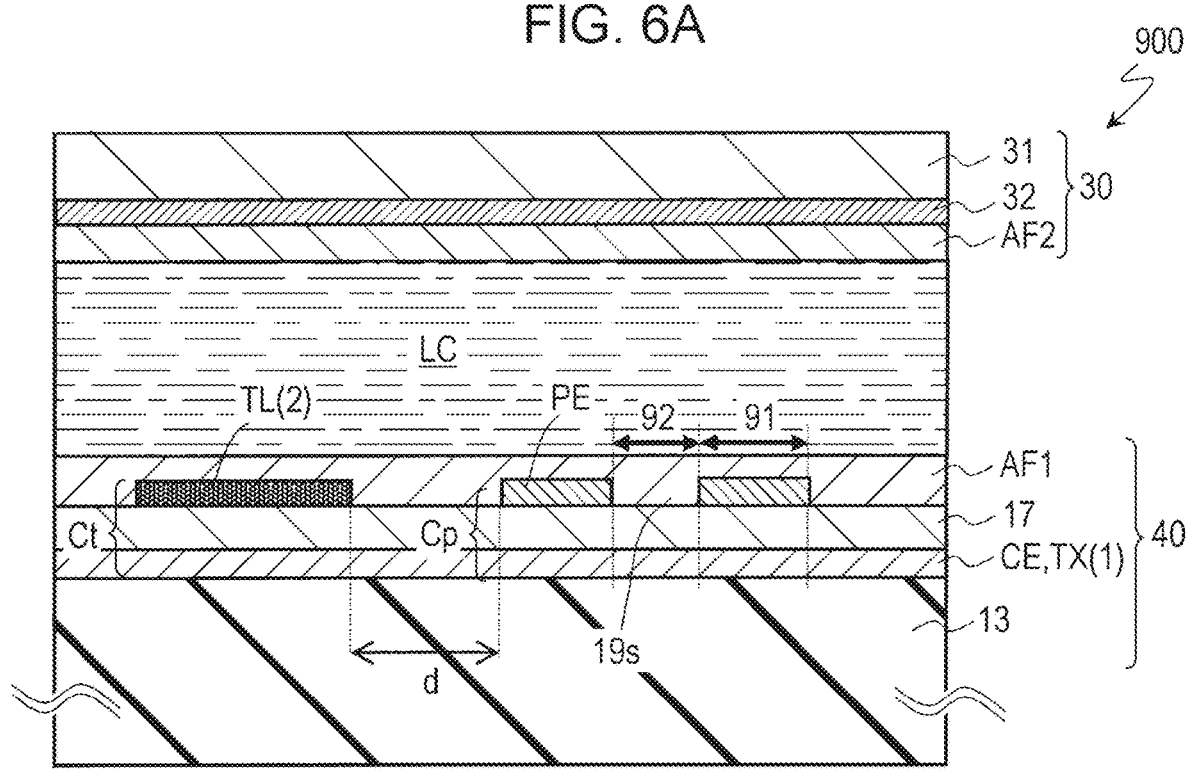
FIG. 6A is a schematic cross-sectional view illustrating a portion of a touch panel using an active matrix substrate according to a comparative example.

FIG. 6A is a schematic cross-sectional view illustrating a portion of a touch panel 900 using an active matrix substrate 40 according to the comparative example. FIG. 6A illustrates a cross-section including the first touch sensor electrode TX(1) and the second touch wiring TL(2). In FIG. 6A, the same components as those in FIG. 4 are designated by the same reference numerals.

In the active matrix substrate 40 according to the comparative example, the second touch wiring TL(2) and the pixel electrode PE are disposed on the first touch sensor electrode TX(1) via the first dielectric layer 17. The touch wiring TL and the pixel electrode PE are both disposed to be in contact with the upper surface of the first dielectric layer 17. Such a configuration is disclosed in Japanese Unexamined Patent Application Publication No. 2016-126336, for example.

In the comparative example, only the first dielectric layer 17 is located between the second touch wiring TL(2) and the first touch sensor electrode TX(1), and a touch wiring capacitance Ct is formed by the second touch wiring TL(2), the first touch sensor electrode TX(1), and the first dielectric layer 17. Therefore, the thickness of the dielectric in the touch wiring capacitance Ct (thickness of the first dielectric layer 17) is the same as the thickness of the dielectric in the transparent auxiliary capacitance Cp. The thickness of the first dielectric layer 17 depends on the desired display performance. Therefore, it is difficult to control the size of the touch wiring capacitance Ct depending on the thickness of the dielectric. In particular, in a case where the first dielectric layer 17 is thinned in order to ensure the transparent auxiliary capacitance Cp due to high definition, there is a possibility that the touch wiring capacitance Ct may increase, and the signal output from the touch wiring TL(2) may be deteriorated.

On the other hand, in the present embodiment, the thickness of the dielectric in the touch wiring capacitance Ct is the total thickness of the first dielectric layer 17 and the second dielectric layer 18, and can be larger than the thickness of the dielectric in the transparent auxiliary capacitance Cp (thickness of the first dielectric layer 17). By increasing only the thickness of the second dielectric layer 18 while maintaining the thickness of the first dielectric layer 17 at a predetermined thickness, the touch wiring capacitance Ct can be reduced while ensuring a high transparent auxiliary capacitance Cp. Therefore, it is possible to suppress deterioration of the signal output from the touch wiring TL due to the touch wiring capacitance Ct, while ensuring high display performance.

Figure 5:
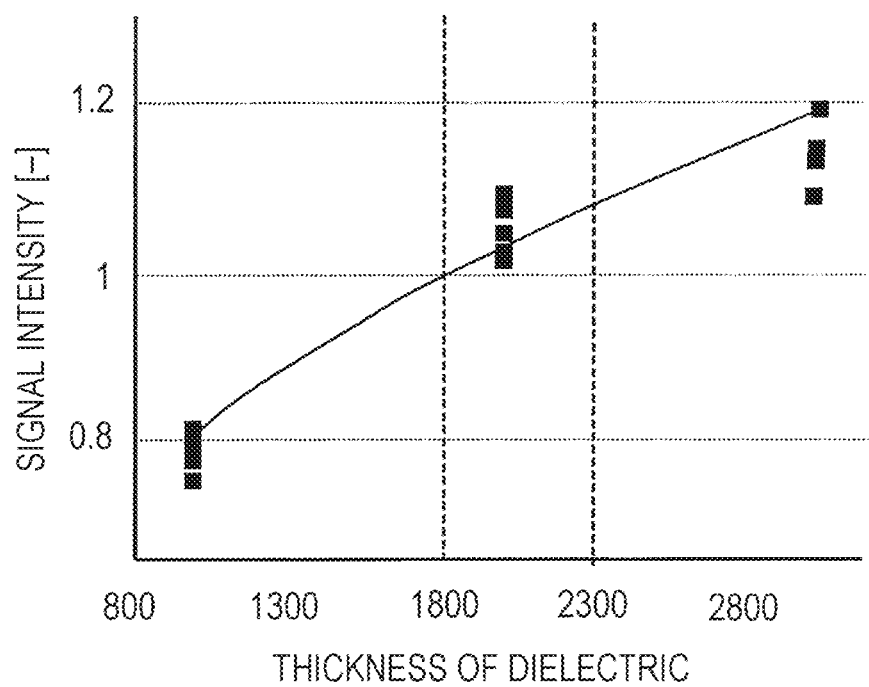
FIG. 5 is a graph illustrating an example of a relationship between a thickness of a dielectric in a touch wiring capacitance and an intensity of a signal extracted from a touch wiring.

FIG. 5 is a graph illustrating an example of a relationship between a thickness of a dielectric in the touch wiring capacitance Ct and an intensity of a signal extracted from the touch wiring TL. The horizontal axis represents the thickness of the dielectric located between the touch wiring TL and the touch sensor electrode TX in the touch wiring capacitance Ct. The material of the dielectric is silicon nitride ($SiN_x$) here. The vertical axis represents an intensity of the output signal from the touch wiring TL (hereinafter, "signal intensity"), and the greater the intensity, the higher the detection sensitivity.

From FIG. 5, it is understood that the thinner the dielectric of the touch wiring capacitance Ct (that is, the larger the capacitance), the greater the signal intensity. It is considered that this is because the signal taken out via the touch wiring TL is deteriorated by the touch wiring capacitance Ct and the detection sensitivity is lowered. For example, assuming that the signal intensity in a case where the touch wiring capacitance Ct includes only the first dielectric layer 17 (thickness: for example, about 180 nm) as a dielectric is 1, in a case where two layers of the first dielectric layer 17 (thickness: for example, about 180 nm) and the second dielectric layer 18 (thickness: for example, about 50 nm) are used as the dielectric (total thickness of dielectric: about 230 nm), the signal intensity can be increased to about 1.1.

As described above, according to the present embodiment, the thicknesses of the dielectrics in the touch wiring capacitance Ct and the transparent auxiliary capacitance Cp can be independently controlled, so that these capacitances can be optimized. Therefore, it is possible to achieve both the sensing performance and the display performance.

The thicknesses of the first dielectric layer 17 and the second dielectric layer 18 are not limited to the thicknesses illustrated with reference to FIG. 5. The thickness of the first dielectric layer 17 is appropriately selected according to the display performance and is set to, for example, about 100 nm or more and 300 nm or less. The thickness of the second dielectric layer 18 is, for example, about 5 nm or more. As a result, the touch wiring capacitance Ct can be reduced more effectively. On the other hand, when the second dielectric layer 18 is too thick, there is a possibility that the voltage applied to the liquid crystal layer may decrease, so that the second dielectric layer 18 is set to, for example, about 100 nm or less. The second dielectric layer 18 may be the thickness of the first dielectric layer 17 or less, or less than the thickness of the first dielectric layer 17. The thickness of the second dielectric layer 18 may be, for example, about 5 nm or more and 20 nm or less.

The first dielectric layer 17 and the second dielectric layer 18 may be formed of the same dielectric material. As a result, a shift of an optimum Vcom described later can be suppressed more effectively. As an example, the first dielectric layer 17 may be a $SiN_x$ layer having a thickness of about 100 nm or more and 300 nm or less, and the second dielectric layer 18 may be a $SiN_x$ layer having a thickness of about 5 nm or more and 100 nm or less. Alternatively, the first dielectric layer 17 and the second dielectric layer 18 may include different dielectric materials. As an example, the first dielectric layer 17 may be a $SiN_x$ layer having a thickness of, for example, about 100 nm to 300 nm, and the second dielectric layer 18 may be a $SiO_2$ layer having a thickness of, for example, about 5 nm to 60 nm. Furthermore, the second dielectric layer 18 may have a laminated structure including, for example, a $SiN_x$ film and a $SiO_2$ film.

According to the present embodiment, the interval between the touch wiring TL and the pixel electrode PE can be reduced, so that higher definition can be achieved.

In the active matrix substrate 40 according to the comparative example, the pixel electrode PE and the touch wiring TL are disposed on the upper surface of the first dielectric layer 17 with an interval d therebetween. In order to more reliably electrically separate the pixel electrode PE and the touch wiring TL, the minimum value of the interval d is set to, for example, about 5 μm or more, although the minimum value depends on the processing accuracy. On the other hand, in the active matrix substrate 101 according to the present embodiment, the touch wiring TL and the pixel electrode PE are electrically separated by the second dielectric layer 18, and thus the interval d between the pixel electrode PE and the touch wiring TL when viewed from the normal direction of the substrate 1 can be reduced. Therefore, it is possible to increase the degree of freedom in selection of the positional relationship between the touch wiring TL and the pixel electrode PE, the width of the touch wiring TL, the shape of the pixel electrode PE, and the like. The minimum value of the interval d is not particularly limited, and may be, for example, about 10 μm or less, desirably about less than 5 μm. In the present embodiment, the edges of the pixel electrode PE and the touch wiring TL may overlap each other when viewed from the normal direction of the substrate 1 (interval d: about 0 μm).

Furthermore, according to the present embodiment, by providing the second dielectric layer 18 on the uppermost layer of the active matrix substrate 101, there is an advantage that the shift of the optimum common potential (hereinafter, "optimum Vcom") can be suppressed. The "optimum Vcom" refers to a common voltage at which the luminance when the voltage applied to the liquid crystal layer LC has positive polarity and the luminance when the voltage applied to the liquid crystal has negative polarity.

The touch panel 900 using the active matrix substrate 40 according to the comparative example may have a problem that the optimum Vcom gradually shifts from the initial value. The reason for this is considered as follows.

Referring back to FIG. 6A. In the active matrix substrate 40, when viewed from the normal direction of the substrate 1, an interface between the pixel electrode PE and the first alignment film AF1 and an interface between the first alignment film AF1 and the liquid crystal layer LC are present on the pixel electrode PE in the first region 91 overlapping the pixel electrode PE. On the other hand, an interface between the common electrode CE and the first dielectric layer 17, an interface between the first dielectric layer 17 and the first alignment film AF1, and an interface between the first alignment film AF1 and the liquid crystal layer LC are present on the common electrode CE in the second region 92 overlapping the slit (or notched portion) 19s of the pixel electrode PE. As described above, the first region 91 and the second region 92 have different laminating relationships. Therefore, when an electric field is generated between the pixel electrode PE and the common electrode CE due to the potential difference between the display signal and the common potential, the amount of charge accumulation on the interface is different between each of the regions 91 and 92. As a result, an undesired DC component is generated between the pixel electrode PE and the common electrode CE, and the shift of the optimum Vcom is likely to occur.

FIGS. 6B to 6E are views for describing a mechanism in which the shift of the optimum Vcom occurs in the touch panel 900, respectively.

Figure 6B:
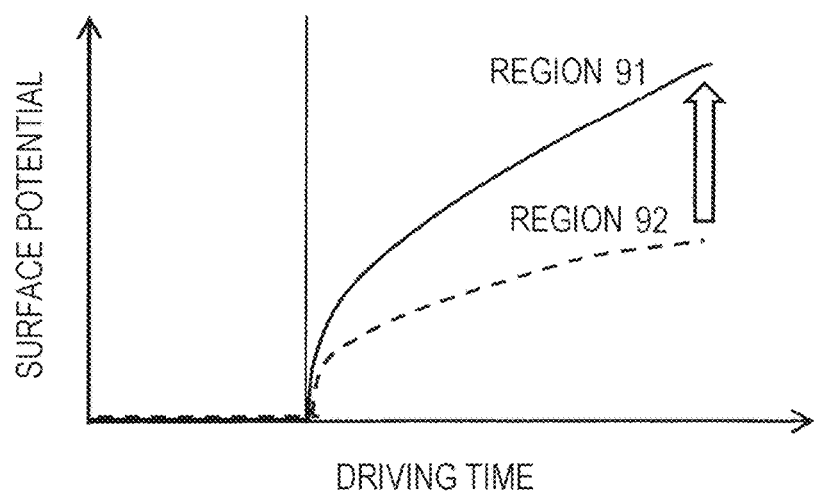
FIG. 6B is a graph illustrating changes in surface potential in a first region and a second region of the active matrix substrate according to the comparative example.

FIG. 6B is a graph illustrating changes in the surface potential in the first region 91 and the second region 92 of the active matrix substrate 40 according to the comparative example, where the vertical axis represents the surface potential and the horizontal axis represents the driving time.

Figure 6C:
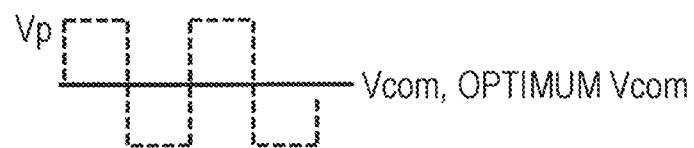
FIG. 6C is a diagram illustrating changes in a pixel electrode potential and a common potential when an ideal display is performed.

When the surface potential is not substantially generated in the first region 91 and the second region 92, ideal display is substantially performed. FIG. 6C illustrates changes in the pixel electrode potential Vp and the common potential Vcom at this time. The difference between these potentials is the voltage applied to the liquid crystal. In FIG. 6C, the common potential (that is, "optimum Vcom") at which the luminance when the voltage applied to the liquid crystal has a positive polarity and the luminance when the voltage applied to the liquid crystal has a negative polarity are equal to each other matches the common potential Vcom applied to the common electrode CE.

Figure 6D:
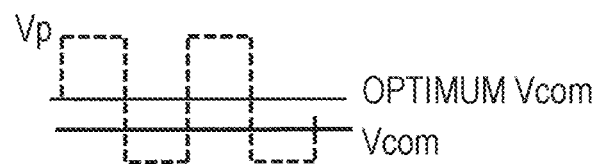
FIG. 6D is a diagram illustrating changes in the pixel electrode potential and the common potential when a shift of an optimum occurs.
Figure 6E:
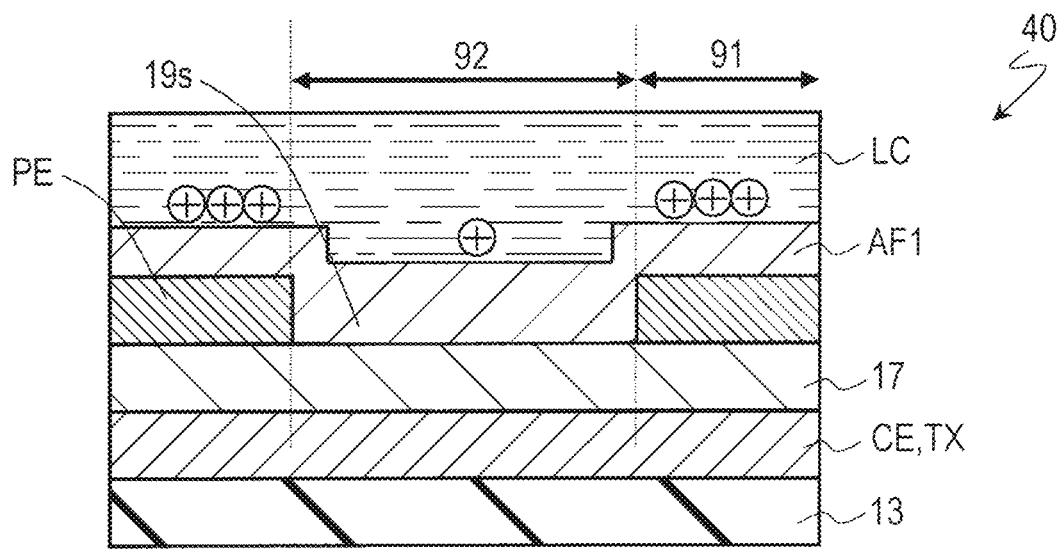
FIG. 6E is a schematic cross-sectional view for describing the surface potential when the shift of the optimum occurs.

By driving the touch panel 900 for a long time, electric charges are accumulated at the above-described interfaces in each of the regions 91 and 92, and the surface potential of the first region 91 is higher than that of the second region 92 as schematically illustrated in FIG. 6E. As a result, an undesired DC component may be generated between the pixel electrode PE and the common electrode CE, and the shift of the optimum Vcom may occur. Changes in the pixel electrode potential Vp and the common potential Vcom at this time are illustrated in FIG. 6D. In FIG. 6D, the optimum Vcom is shifted in the positive direction from the common potential Vcom.

The problem of the optimum Vcom shift is described in detail in, for example, Japanese Unexamined Patent Application Publication No. 2009-223267. All the contents described in Japanese Unexamined Patent Application Publication No. 2009-223267 are incorporated herein by reference.

On the other hand, in the touch panel 1000 (FIG. 4) using the active matrix substrate 101 of the present embodiment, the second dielectric layer 18 is provided between the pixel electrode PE, the first dielectric layer 17, and the first alignment film AF1. Therefore, when viewed from the normal direction of the substrate, it is possible to match the laminating relationship between the first region 81 overlapping the pixel electrode PE and the second region 82 overlapping the slit (or notched portion) 19s of the pixel electrode PE. Specifically, an interface between the pixel electrode PE and the inorganic insulating film (second dielectric layer 18), an interface between the inorganic insulating film (second dielectric layer 18) and the first alignment film AF1, and an interface between the first alignment film AF1 and the liquid crystal layer LC are present in the first region 81. An interface between the common electrode CE and the inorganic insulating film (first dielectric layer 17 and second dielectric layer 18), an interface between the inorganic insulating film (first dielectric layer 17 and second dielectric layer 18) and the first alignment film AF1, and an interface between the first alignment film AF1 and the liquid crystal layer LC are present in the second region 82. As a result, the amounts of charge accumulation in the first region 81 and the second region 82 can be substantially equal to each other, and the shift of the optimum Vcom can be suppressed. The first dielectric layer 17 and the second dielectric layer 18 are both inorganic insulating films, and the influence of the interface between these layers is small. Therefore, even when the first dielectric layer 17 and the second dielectric layer 18 are formed of different materials, these layers can be regarded as one layer. When the first dielectric layer 17 and the second dielectric layer 18 are formed of the same material (for example, silicon nitride ($SiN_x$)), the influence of the interface between the first dielectric layer 17 and the second dielectric layer 18 is further reduced. Therefore, the optimum Vcom shift can be suppressed more effectively. In a case where the first region 81 and the second region 82 have the same laminating relationship (having symmetry), the above effect can be obtained regardless of the thickness of the inorganic insulating film.

Method for Manufacturing Active Matrix Substrate 101

Hereinafter, with reference to FIGS. 7A to 7F and FIG. 8, the method for manufacturing the active matrix substrate according to the present embodiment will be described by taking the active matrix substrate 101 as an example.

FIGS. 7A to 7F are steps sectional views illustrating an example of the method for manufacturing the active matrix substrate 101, respectively. These cross-sectional views correspond to the cross-section taken along the line IIC-IIC illustrated in FIG. 2A. FIG. 8 is a flowchart illustrating an example of the method for manufacturing the active matrix substrate 101.

First, as illustrated in FIG. 7A, the TFT 20 is formed on the substrate 1, and thereafter the interlayer insulating layer 13 that covers the TFT 20 is formed (STEP 1 to STEP 5).

STEP 1: Formation of Gate Metal Layer

A conductive film for gate (thickness: for example, about 50 nm or more and 500 nm or less) is formed on the substrate 1 by, for example, a sputtering method. Next, patterning (for example, wet etching) of the conductive film for gate is performed by a known photolithography step. As described above, the gate metal layer including the gate bus line GL and the gate electrode GE is formed.

As the substrate 1, a transparent substrate having insulation such as a glass substrate, a silicon substrate, or a plastic substrate having heat resistance (resin substrate) can be used.

The material of the conductive film for gate is not particularly limited, and a film containing a metal such as aluminum (Al), tungsten (W), molybdenum (Mo), tantalum (Ta), chromium (Cr), titanium (Ti), or and copper (Cu), an alloy thereof, or a metal nitride thereof can be appropriately used. A laminated film in which a plurality of these films are laminated may be used.

STEP 2: Formation of Gate Insulating Layer 5

Next, a gate insulating layer 5 (thickness: for example, about 200 nm or more and 600 nm or less) is formed so as to cover the gate metal layer.

The gate insulating layer 5 is formed by, for example, a CVD method. As the gate insulating layer 5, a silicon oxide ($SiO_x$) layer, a silicon nitride ($SiN_x$) layer, a silicon oxynitride ($SiO_xN_y$; x>y) layer, a silicon nitride oxide ($SiN_xO_y$; x>y) layer, or the like can be appropriately used. The gate insulating layer 5 may be a single layer or may have a laminated structure. For example, a silicon nitride ($SiN_x$) layer, a silicon nitride oxide layer, or the like may be formed on the substrate side (lower layer) to restrain diffusion of impurities and the like from the substrate 1, and a silicon oxide ($SiO_2$) layer, a silicon oxynitride layer, or the like may be formed on a layer thereover (upper layer) to secure insulation. Here, as the gate insulating layer 5, a laminated film having a silicon nitride ($SiN_x$) layer (thickness: about 50 to 600 nm) as a lower layer and a silicon oxide ($SiO_2$) layer (thickness: about 50 to 600 nm) as an upper layer is formed. In a case where an oxide film such as a silicon oxide film is used as the gate insulating layer 5 (in a case where the gate insulating layer 5 has a laminated structure, as an uppermost layer), since oxidation deficiency generated in a channel region of an oxide semiconductor layer formed later can be reduced by the oxide film, reduction in resistance of the channel region can be suppressed.

STEP 3: Formation of Oxide Semiconductor Layer 7

Subsequently, an oxide semiconductor film (not illustrated) is formed on the gate insulating layer 5. Thereafter, annealing treatment of the oxide semiconductor film may be performed. The thickness of the oxide semiconductor film may be, for example, about 15 nm or more and 200 nm or less. The oxide semiconductor film can be formed by, for example, a sputtering method. Here, an In—Ga—Zn—O-based semiconductor film (thickness: about 50 nm) containing In, Ga, and Zn is formed as the oxide semiconductor film.

Subsequently, patterning of the oxide semiconductor film is performed by a known photolithography step. As a result, an oxide semiconductor layer 7 to be an active layer of the TFT 20 is obtained.

STEP 4: Formation of Source Metal Layer

Next, after depositing a conductive film for source (thickness: for example, about 50 nm or more and 500 nm or less) on the oxide semiconductor layer 7 by a sputtering method or the like, the conductive film for source is patterned by a known photolithography step. As a result, a source metal layer including the source electrode SE, the drain electrode DE, and the source bus line SL is obtained.

As a conductive film for source, for example, an element selected from aluminum (Al), chromium (Cr), copper (Cu), tantalum (Ta), titanium (Ti), molybdenum (Mo), or tungsten (W), or an alloy containing these elements as components can be used. The conductive film for source may have a single layer structure or a laminated structure.

STEP 5: Formation of Interlayer Insulating Layer 13

Next, the interlayer insulating layer 13 is formed on the TFT 20 by the CVD method or the like. In the present embodiment, as the interlayer insulating layer 13, an inorganic insulating layer (thickness: for example, about 0.1 μm or more and 1 μm or less) 11 and an organic insulating layer (thickness: for example, about 1 μm or more and 3 μm or less) 12 are formed in this order. Alternatively, the organic insulating layer 12 may not be formed.

As the inorganic insulating layer 11, a single layer or a laminated layer of a silicon oxide film, a silicon nitride film, a silicon oxynitride film, a silicon nitride oxide film, aluminum oxide, or tantalum oxide can be formed.

Next, the organic insulating layer 12 having the opening portion 12p is formed on the inorganic insulating layer 11. The organic insulating layer 12 can be formed, for example, by applying a positive photosensitive resin material (for example, acrylic resin material) on the inorganic insulating layer 11, and thereafter exposing and developing the material. The opening portion 12p is formed at a position overlapping the drain electrode DE when viewed from the normal direction of the substrate 1.

STEP 6: Formation of Common Electrode CE (FIG. 7B)

Figure 7B:
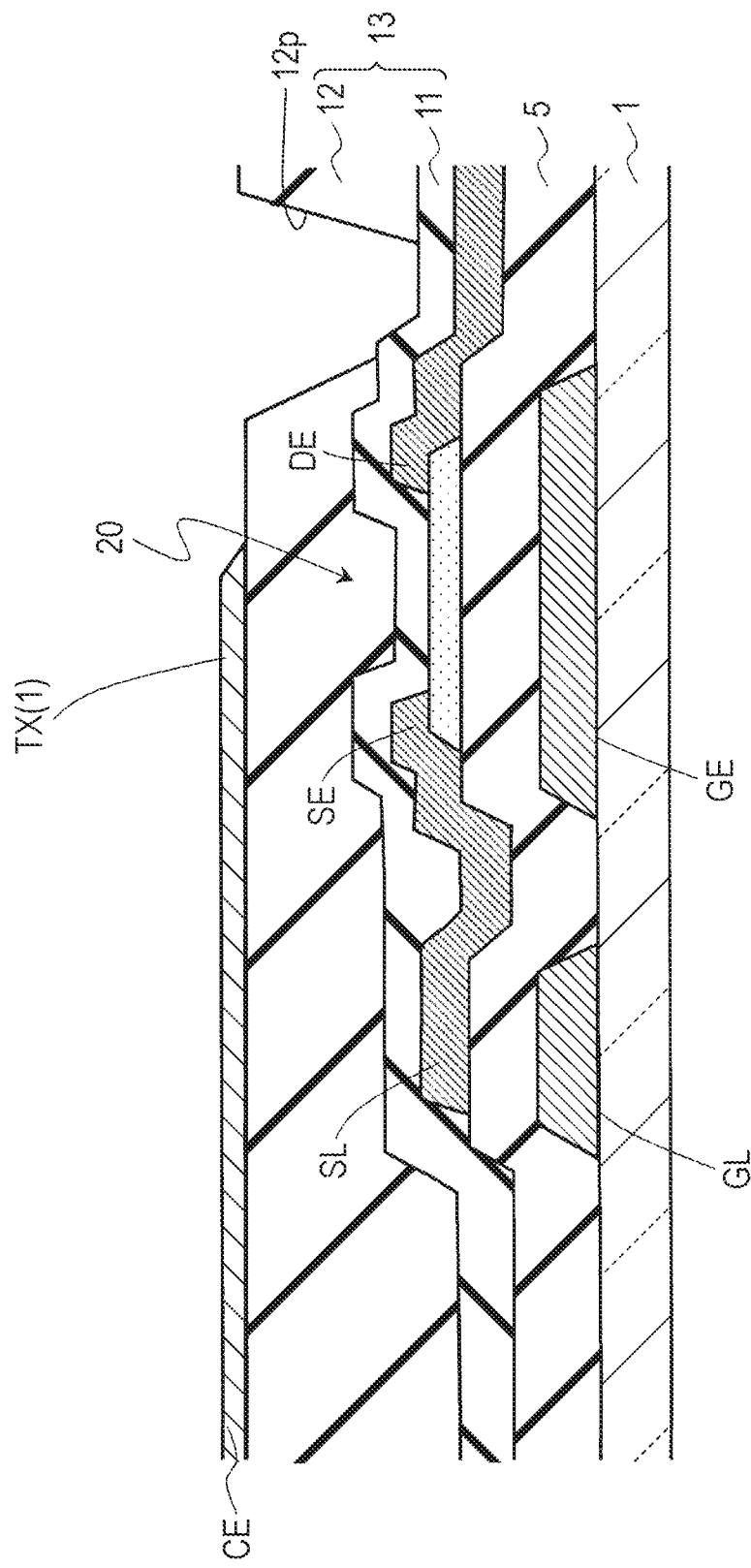
FIG. 7B is a step sectional view illustrating the method for manufacturing the active matrix substrate.

Subsequently, as illustrated in FIG. 7B, a common electrode CE is formed on the interlayer insulating layer 13.

First, a first transparent conductive film (not illustrated) (thickness: about 20 to 300 nm) is formed on the interlayer insulating layer 13 and in the opening portion 12p. Here, for example, an indium-zinc oxide film is formed as the first transparent conductive film by a sputtering method. As a material of the first transparent conductive film, a metal oxide such as indium-tin oxide (ITO), indium-zinc oxide, or ZnO can be used.

Thereafter, the first transparent conductive film is patterned to obtain the common electrode CE. For example, wet etching of the first transparent conductive film may be performed using an oxalic acid-based etching solution. The common electrode CE is divided by slits into a plurality of segments each of which functions as a touch sensor electrode TX. The common electrode CE has an opening portion 15p in a region where the pixel contact portion is formed.

STEP 7: Formation of First Dielectric Layer 17 (FIG. 7C)

Figure 7C:
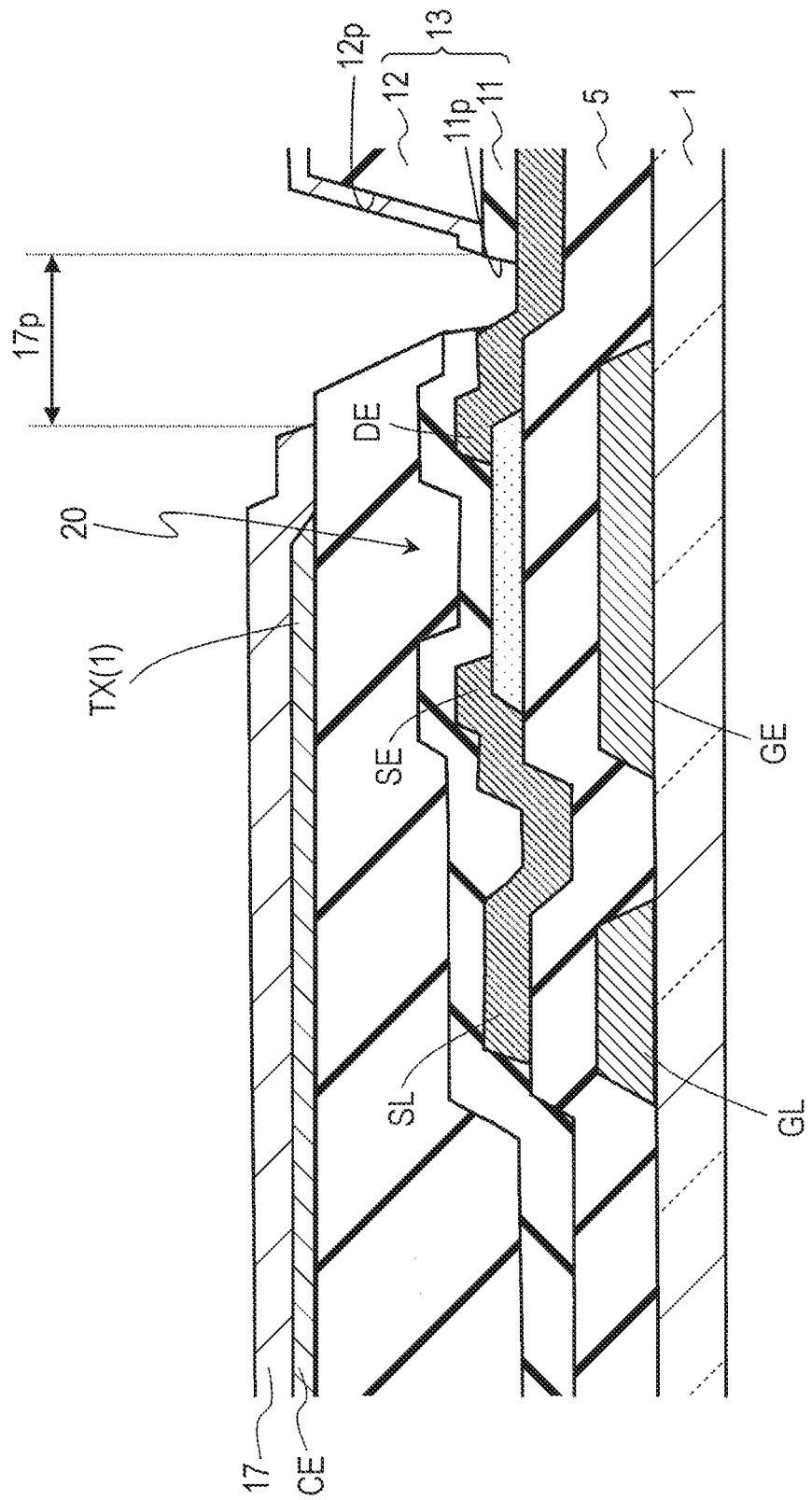
FIG. 7C is a step sectional view illustrating the method for manufacturing the active matrix substrate.

Next, as illustrated in FIG. 7C, a first dielectric layer (thickness: about 100 nm or more and 300 nm or less) 17 is formed so as to cover the common electrode CE. The first dielectric layer 17 may be, for example, a silicon oxide film, a silicon nitride film, a silicon oxynitride film, a silicon nitride oxide film, or a laminated film including at least one of these films. Here, as the first dielectric layer 17, for example, a silicon nitride ($SiN_x$) film is formed by the CVD method.

Thereafter, a resist layer (not illustrated) is formed on the first dielectric layer 17 by a photolithography step, and the first dielectric layer 17 and the inorganic insulating layer 11 are patterned (for example, dry etching). The etching of the first dielectric layer 17 and the inorganic insulating layer 11 may be performed in the same etching step. The first dielectric layer 17 is etched using the resist layer as a mask to form an opening portion 17p. The opening portion 17p may be at least partially overlapped the opening portion 12p when viewed from the normal direction of the substrate 1. The inorganic insulating layer 11 is etched by using the resist layer and the organic insulating layer 12 as a mask to form an opening portion 11p exposing a portion of the drain electrode DE. A side surface of the opening portion 11p is at least partially aligned with a side surface of the opening portion 17p or a side surface of the opening portion 12p. A portion of the side surface of the opening portion 11p may be aligned with the side surface of the opening portion 12p, and a portion of the other side surface may be aligned with the side surface of the opening portion 17p. As described above, a pixel contact hole including the opening portion 17p, the opening portion 12p, and the opening portion 11p is obtained.

The etching step of forming the opening portion 11p in the inorganic insulating layer 11 may be performed, for example, by using the organic insulating layer 12 as a mask after forming the organic insulating layer 12 and before forming the common electrode CE. In this case, the side surface of the opening portion 11p is aligned with the side surface of the opening portion 12p.

Figure 7D:
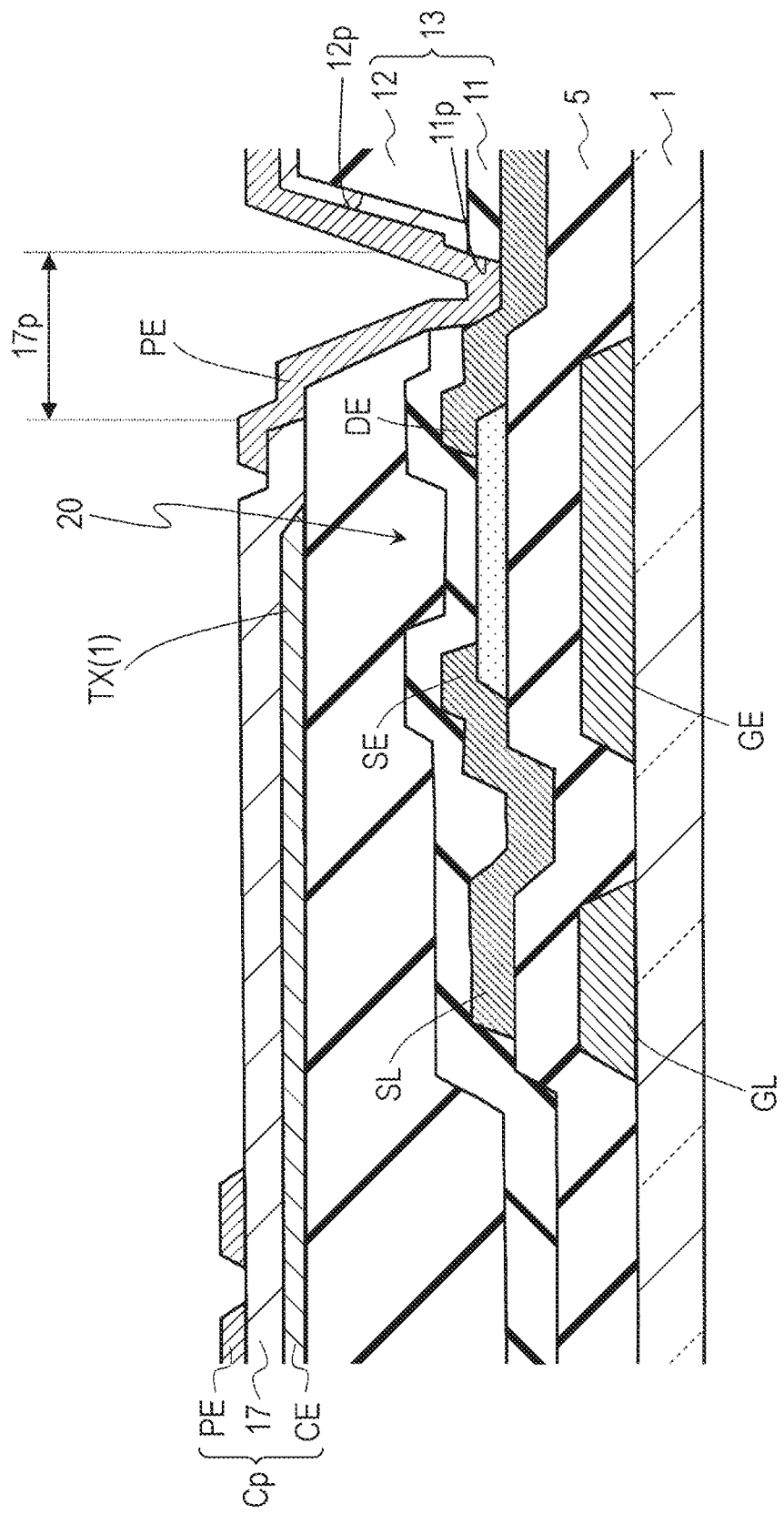
FIG. 7D is a step sectional view illustrating the method for manufacturing the active matrix substrate.

STEP 8: Formation of Pixel Electrode PE (FIG. 7D)

Subsequently, a second transparent conductive film (not illustrated) (thickness: about 20 to 300 nm) is formed on the first dielectric layer 17 and in the pixel contact hole. The material of the second transparent conductive film may be the same as the material exemplified as the material of the first transparent conductive film (for example, ITO).

Thereafter, patterning of the second transparent conductive film is performed. Here, for example, wet etching of the second transparent conductive film may be performed using an oxalic acid-based etching solution. As a result, the pixel electrode PE is obtained as illustrated in FIG. 7D. The pixel electrode PE is separated for each pixel region PIX. Each of the pixel electrodes PE is formed on the first dielectric layer 17 and in the pixel contact hole, and is in contact with the drain electrode DE in the pixel contact hole. At least one slit or a notched portion is formed in the pixel region PIX in the pixel electrode PE.

STEP 9: Formation of Second Dielectric Layer 18 (FIG. 7E)

Figure 7E:
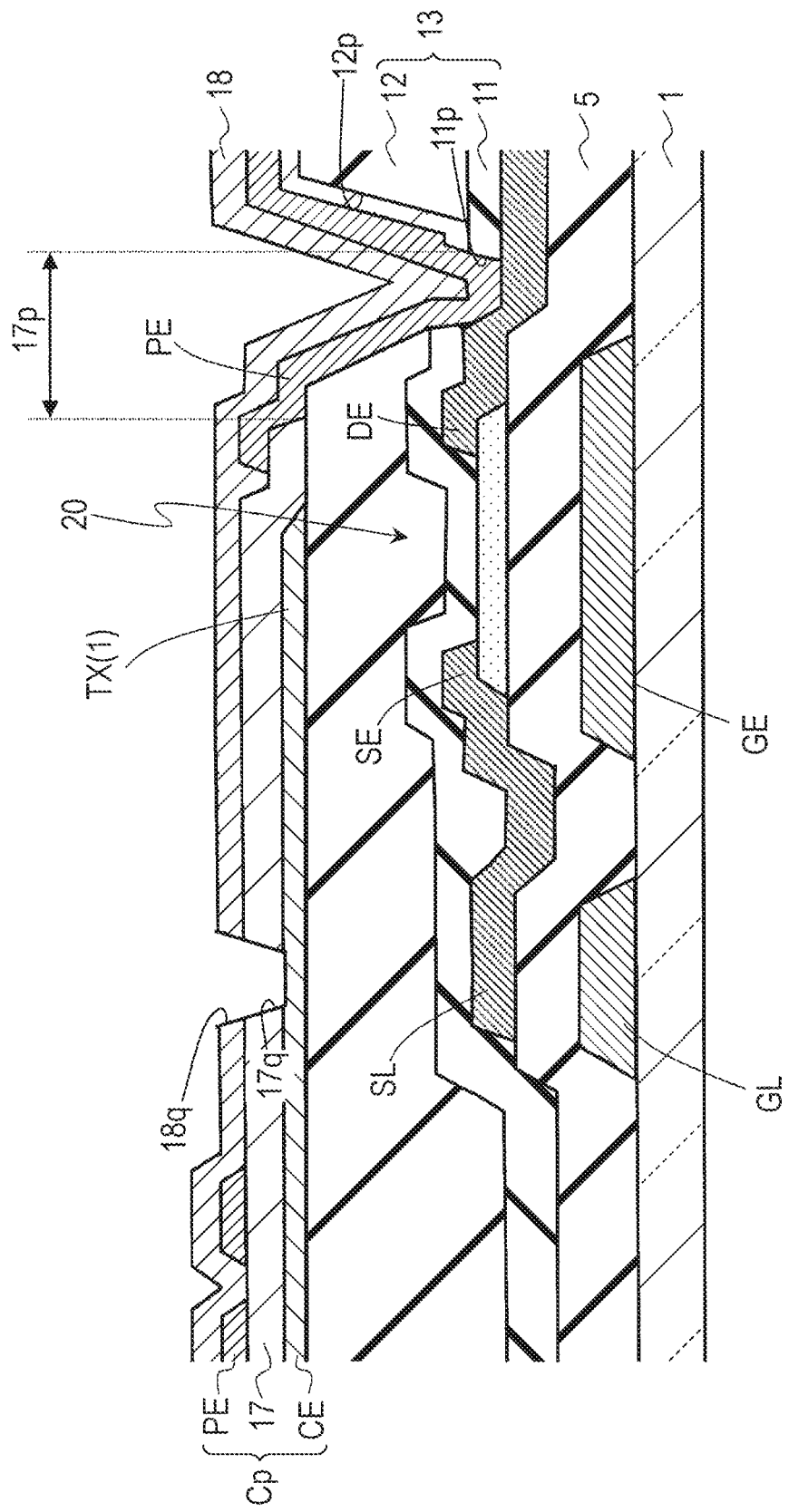
FIG. 7E is a step sectional view illustrating the method for manufacturing the active matrix substrate.

Next, as illustrated in FIG. 7E, a second dielectric layer (thickness: about 5 nm or more and 100 nm or less, here about 5 nm or more and 10 nm or less) 18 is formed so as to cover the first dielectric layer 17 and the pixel electrode PE. The second dielectric layer 18 may be a single layer film or a laminated film of the dielectric films exemplified as the first dielectric layer 17. The material of the second dielectric layer 18 may be the same as the material of the first dielectric layer 17. Here, as the second dielectric layer 18, for example, a $SiN_x$ film is formed by the CVD method.

Thereafter, a resist layer (not illustrated) may be formed on the second dielectric layer 18 by a photolithography step, and the second dielectric layer 18 and the first dielectric layer 17 may be patterned (for example, dry etching). As a result, a sensor contact hole that exposes a portion of the touch sensor electrode TX is formed in the first dielectric layer 17 and the second dielectric layer 18. The sensor contact hole includes an opening portion 17q in the first dielectric layer 17 and an opening portion 18q in the second dielectric layer 18. Side surfaces of the opening portion 17q and the opening portion 18q may be aligned with each other.

STEP 10: Formation of Touch Wiring TL (FIG. 7F)

Subsequently, a conductive film for touch wiring (thickness: about 50 to 500 nm) is formed on the second dielectric layer 18 and in the sensor contact hole. As the conductive film for touch wiring, a conductive film similar to the conductive film for gate or the conductive film for source (here, metal film) can be used. For example, a single layer or laminated structure film mainly containing Cu or Al may be formed by a sputtering method.

Figure 7F:
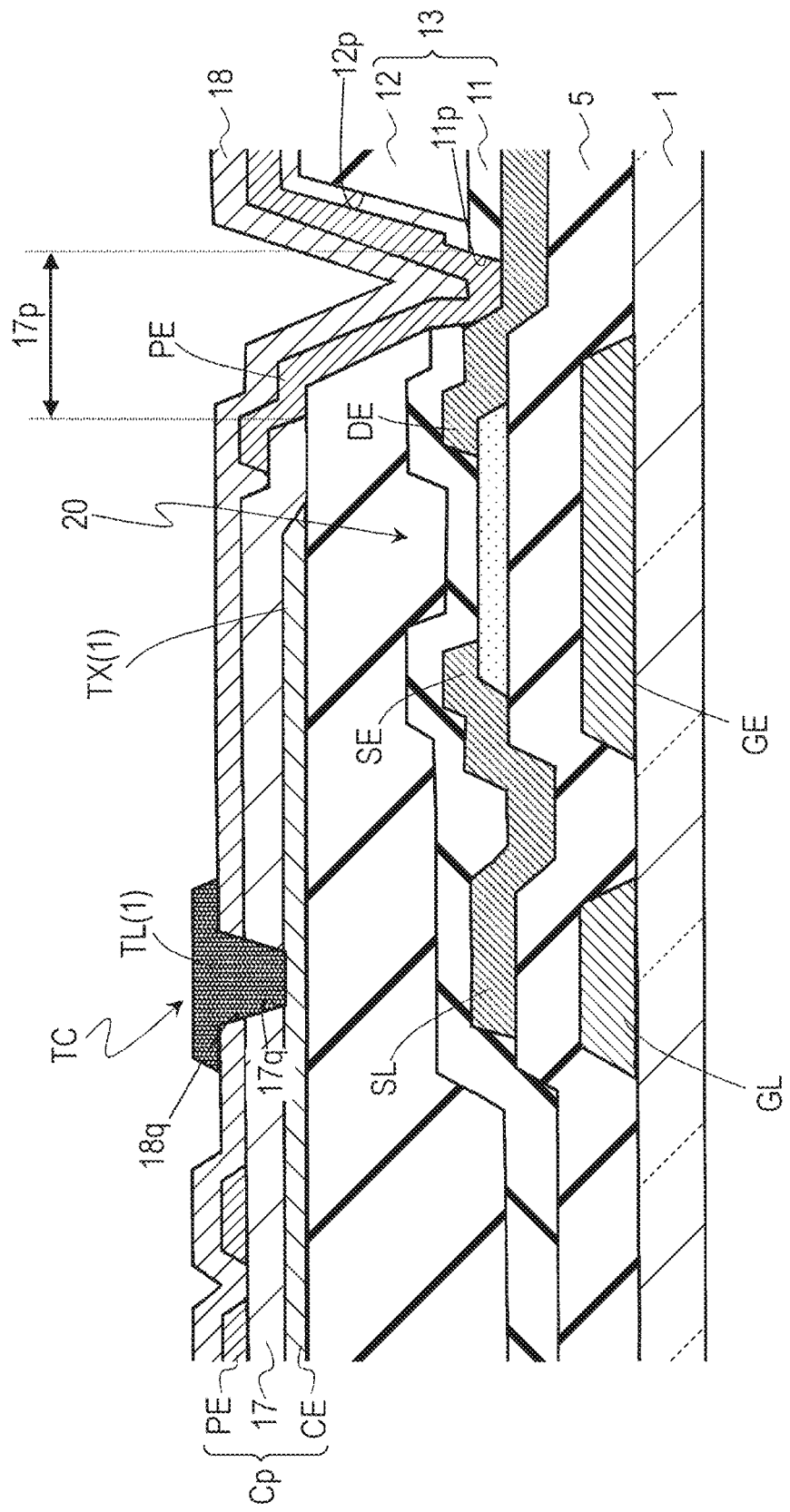
FIG. 7F is a step sectional view illustrating the method for manufacturing the active matrix substrate.

Subsequently, by patterning the conductive film for touch wiring, a touch wiring layer including the touch wiring TL is formed as illustrated in FIG. 7F. The touch wiring TL (here, first touch wiring TL(1)) is electrically connected to the corresponding touch sensor electrode TX (here, first touch sensor electrode TX(1)) in the corresponding sensor contact hole.

STEP 11: Formation of First Alignment Film AF1

Thereafter, although not illustrated, a first alignment film AF1 (for example, polyimide film) is formed so as to cover the second dielectric layer 18 and the touch wiring layer. The first alignment film AF1 may be disposed so as to be in direct contact with the upper surface of the second dielectric layer 18. As described above, the active matrix substrate 101 can be manufactured.

Modification Example

Figure 9A:
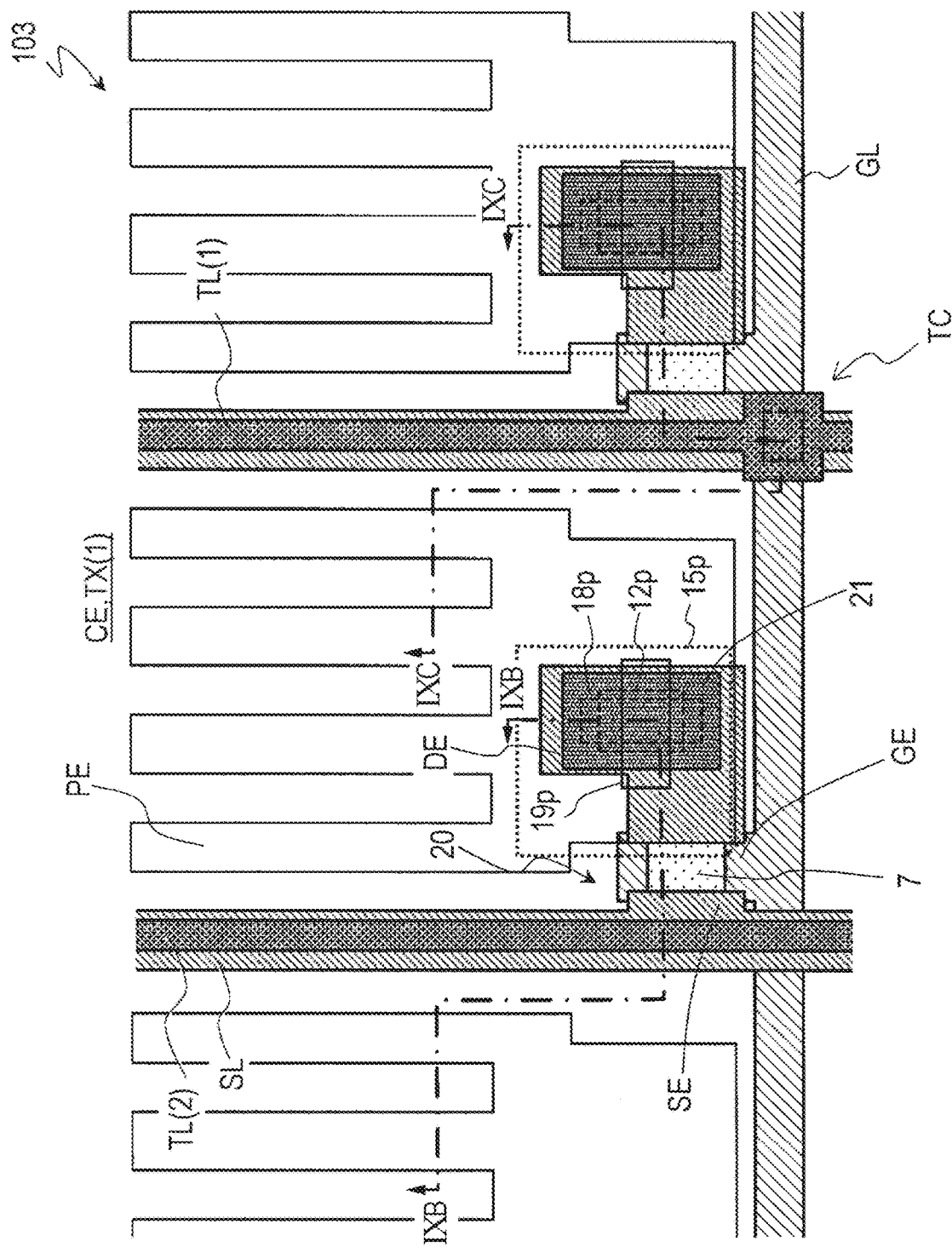
FIG. 9A is a plan view illustrating a pixel region of an active matrix substrate according to a modification example.
Figure 9B:
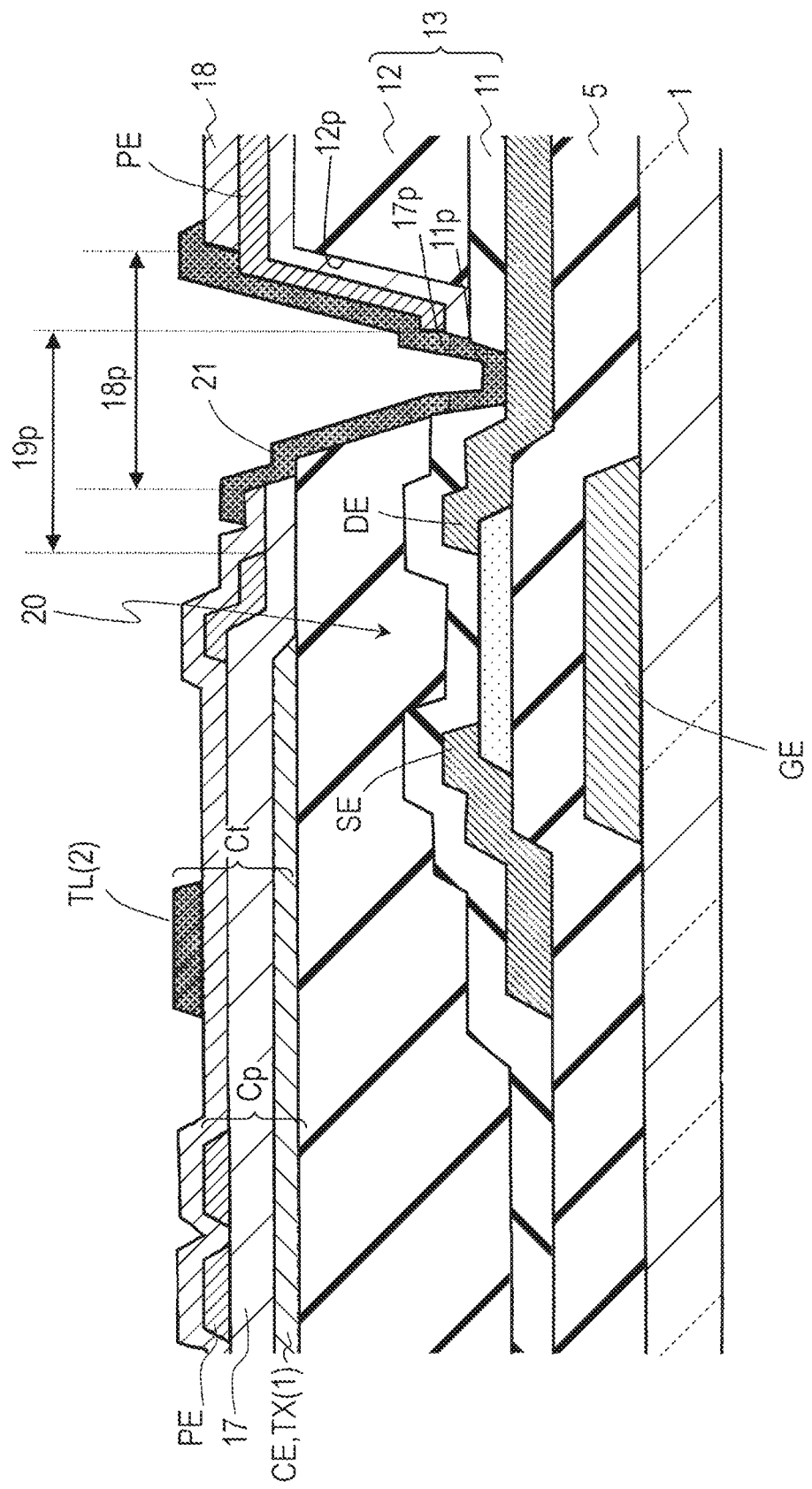
FIG. 9B is a cross-sectional view taken along line IXB-IXB illustrated in FIG. 9A in the pixel region of the active matrix substrate.
Figure 9C:
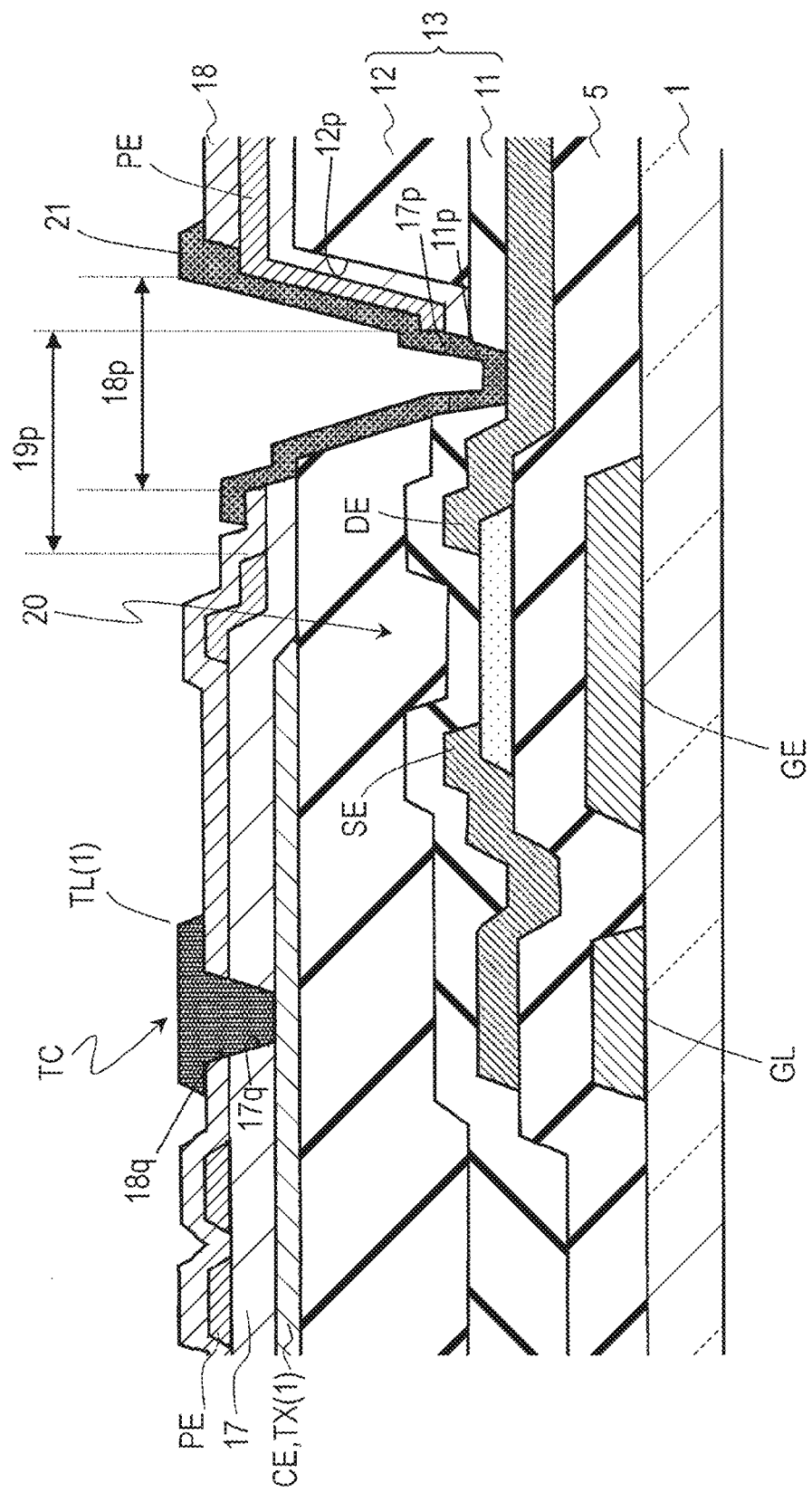
FIG. 9C is a cross-sectional view taken along line IXC-IXC illustrated in FIG. 9A in the pixel region of the active matrix substrate.

FIG. 9A is a plan view illustrating an active matrix substrate 103 of a modification example according to the present embodiment. FIGS. 9B and 9C are cross-sectional views taken along lines IXB-IXB and IXC-IXC illustrated in FIG. 9A, respectively.

The active matrix substrate 103 is further provided with a plurality of connection electrodes 21 formed using the same conductive film as the touch wiring TL (that is, in the touch wiring layer). The connection electrode 21 is disposed in an island shape in each of the pixel regions PIX, and is electrically separated from the touch wiring TL. In each of the pixel contact portions, the pixel electrode PE is electrically connected to the drain electrode DE of the TFT 20 via the corresponding connection electrode 21.

A pixel contact hole that exposes a portion of the drain electrode DE (hereinafter, "first portion") of the TFT 20 is formed in each of the pixel contact portions. The pixel contact hole includes a first opening portion formed in the interlayer insulating layer 13 and the first dielectric layer 17, a second opening portion (or notched portion) 19p formed in the pixel electrode PE, and a third opening portion 18p formed in the second dielectric layer 18. The first opening portion includes, for example, the opening portion 17p of the first dielectric layer 17, the opening portion 12p of the organic insulating layer 12, and the opening portion 11p of the inorganic insulating layer 11. The third opening portion 18p is disposed so as to expose a portion of the pixel electrode PE.

The connection electrode 21 is disposed on the second dielectric layer 18 and in the pixel contact hole, and is electrically connected to the exposed portion of the pixel electrode PE (portion exposed by the third opening portion 18p) and the first portion of the drain electrode DE in the pixel contact hole. As a result, the pixel electrode PE and the TFT 20 are electrically connected to each other.

In the above-described active matrix substrate 101, in order to form the pixel contact hole, the pixel electrode PE is formed in the opening portion 17p after forming the opening portion 17p configuring the pixel contact hole in the first dielectric layer 17. Therefore, in STEP 7 (that is, before the pixel electrode PE is formed), the etching step of the first dielectric layer 17 is performed. The sensor contact hole can be formed by simultaneously etching the second dielectric layer 18 and the first dielectric layer 17 in STEP 9.

On the other hand, in the active matrix substrate 103 according to the modification example, not only the sensor contact hole but also the pixel contact hole can be formed by simultaneously etching the first dielectric layer 17 and the second dielectric layer 18. As a result, a photolithography step of patterning the first dielectric layer 17 is dispensed with before forming the pixel electrode PE. Therefore, as compared with the active matrix substrate 101, the number of photomasks can be reduced and the manufacturing cost can be reduced.

As will be described later, in a case where the interlayer insulating layer 13 includes the inorganic insulating layer 11, the second dielectric layer 18, the first dielectric layer 17, and the inorganic insulating layer 11 are etched in the same step, so that the third opening portion 18p may be formed in the second dielectric layer 18, and the opening portions 17p and 11p configuring the first opening portion may be formed in the first dielectric layer 17 and the inorganic insulating layer 11. In this case, at least a portion of the side surface of the first opening portion (side surfaces of the opening portion 17p and opening portion 11p) may be aligned with the side surface of the second opening portion (or notched portion) 19p of the pixel electrode PE, or the side surface of the third opening portion 18p of the second dielectric layer 18. As illustrated, a portion of the side surface of the first opening portion (side surfaces of the opening portion 17p and the opening portion 11p) may be aligned with the side surface of the second opening portion (or notched portion) 19p of the pixel electrode PE, and a portion of the other side surface may be aligned with the side surface of the third opening portion 18p of the second dielectric layer 18.

For example, since the first dielectric layer 17 is etched by using the resist layer on the second dielectric layer 18 and the pixel electrode PE as a mask, the side surface of the opening portion 17p may be at least partially aligned with the side surface of the second opening portion 19p or the side surface of the third opening portion 18p of the pixel electrode PE. Since the inorganic insulating layer 11 is etched by using the resist layer on the second dielectric layer 18, the pixel electrode PE, and the organic insulating layer 12 as a mask, the side surface of the opening portion 11p may be at least partially aligned with the side surface of the second opening portion 19p of the pixel electrode PE, the side surface of the opening portion 12p of the organic insulating layer 12, or the side surface of the third opening portion 18p. The side surface of the second opening portion 19p may be aligned with the side surfaces of the opening portions 17p and 11p, or may be located outside thereof. Similarly, the side surface of the third opening portion 18p may be aligned with the side surfaces of the opening portions 17p and 11p, or may be located outside thereof.

The first dielectric layer 17 may be disposed between the side surface of the organic insulating layer 12 and the pixel electrode PE. A portion of the side surface of the organic insulating layer 12, which is not covered with the pixel electrode PE, may be in direct contact with the connection electrode 21.

Figure 10A:
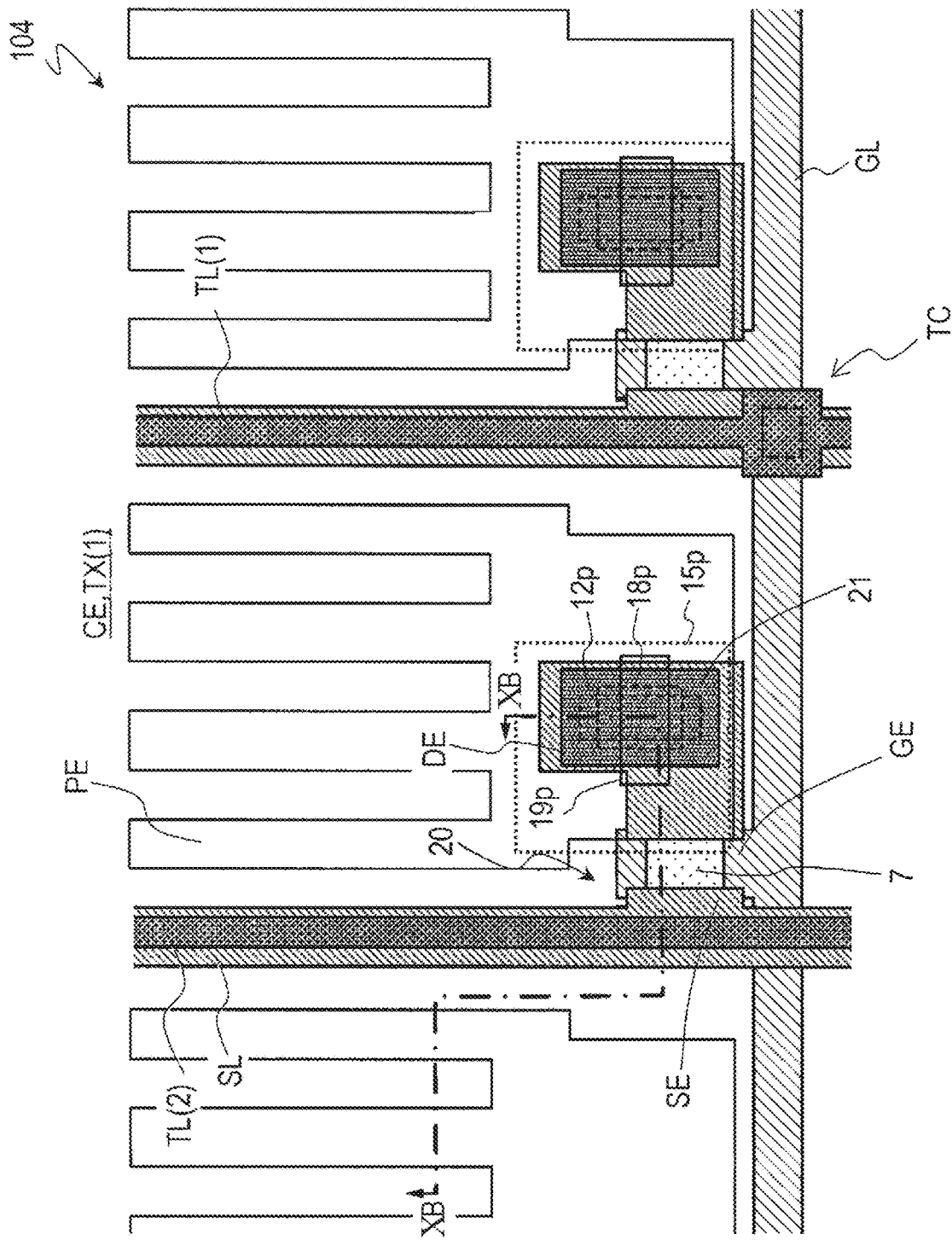
FIG. 10A is a plan view illustrating a pixel region of another active matrix substrate according to the modification example.
Figure 10B:
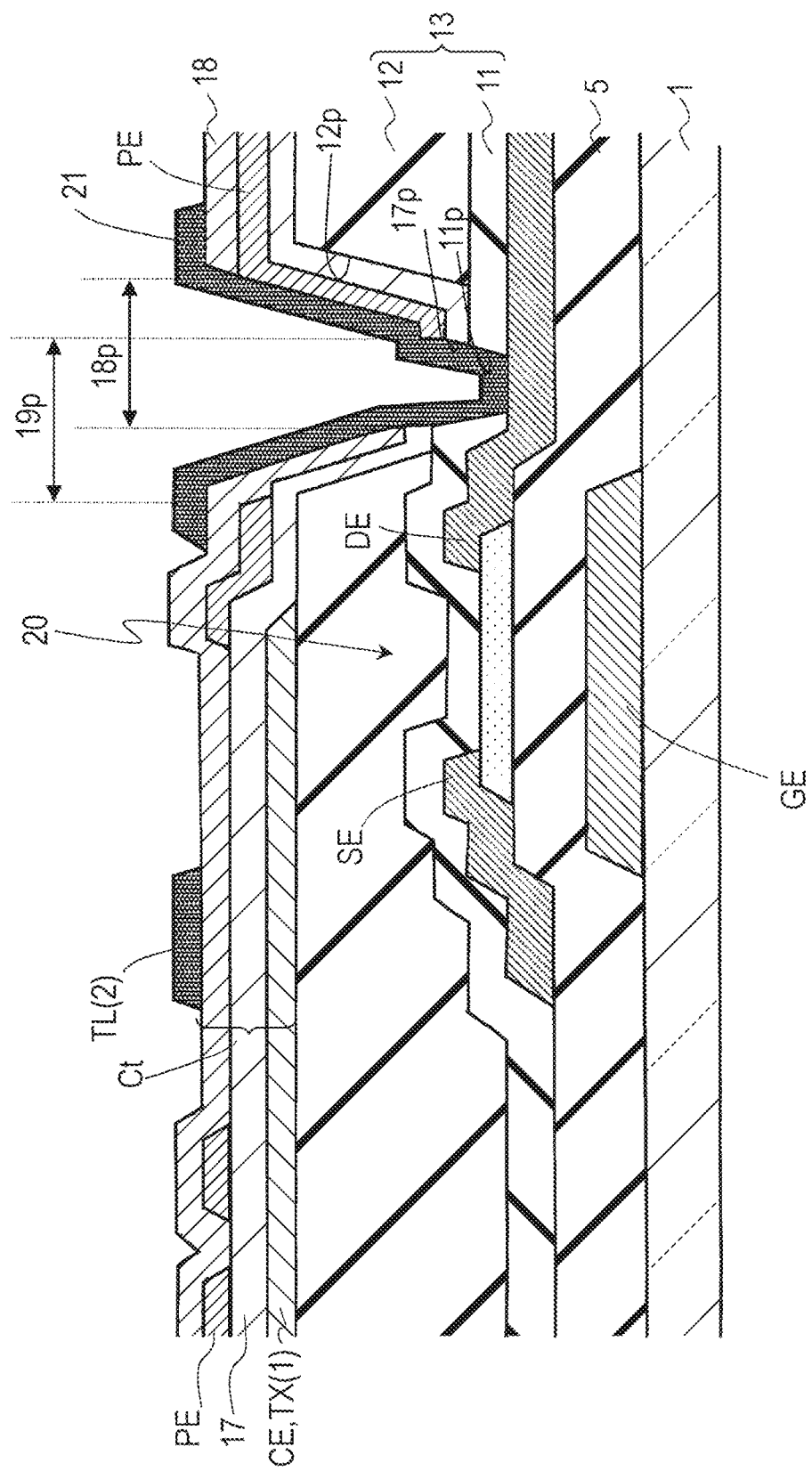
FIG. 10B is a cross-sectional view taken along line XB-XB illustrated in FIG. 10A in the pixel region of the active matrix substrate.

FIGS. 10A and 10B are a plan view and a cross-sectional view illustrating a pixel region of another active matrix substrate 104, respectively. Illustration of a cross-section including the touch wiring contact portion TC is omitted.

In FIG. 9A, when viewed from the normal direction of the substrate 1, the opening portion 18p extends in the y direction (column direction) across the opening portion 12p, and as illustrated in FIG. 10A, the opening portion 18p may extend in the x direction (row direction) across the opening portion 12p. In this case, as illustrated in FIG. 10B, a connection electrode 21 may be provided on a portion of the side surface of the organic insulating layer 12 not covered with the pixel electrode PE, via the first dielectric layer 17 and the second dielectric layer 18.

Method for Manufacturing Active Matrix Substrate 103

A method for manufacturing the active matrix substrate according to the modification example will be described by taking the method for manufacturing the active matrix substrate 103 as an example. Hereinafter, differences from the method for manufacturing the active matrix substrate 101 will be mainly described. The thickness, material, forming method, and the like of each of the layers are the same as those of the active matrix substrate 101, and thus the description thereof will be appropriately omitted.

FIGS. 11A to 11D are step sectional views for describing the method for manufacturing the active matrix substrate 103. FIG. 12 is a flowchart illustrating an example of the method for manufacturing the active matrix substrate 103.

First, similarly to the steps (STEP 1 to STEP 6) described above with reference to FIGS. 7A to 7D, the TFT 20, the interlayer insulating layer 13 covering the TFT 20, and the common electrode CE are formed on the substrate 1.

STEP 7-2: Formation of First Dielectric Layer 17 (FIG. 11A)

Figure 11A:
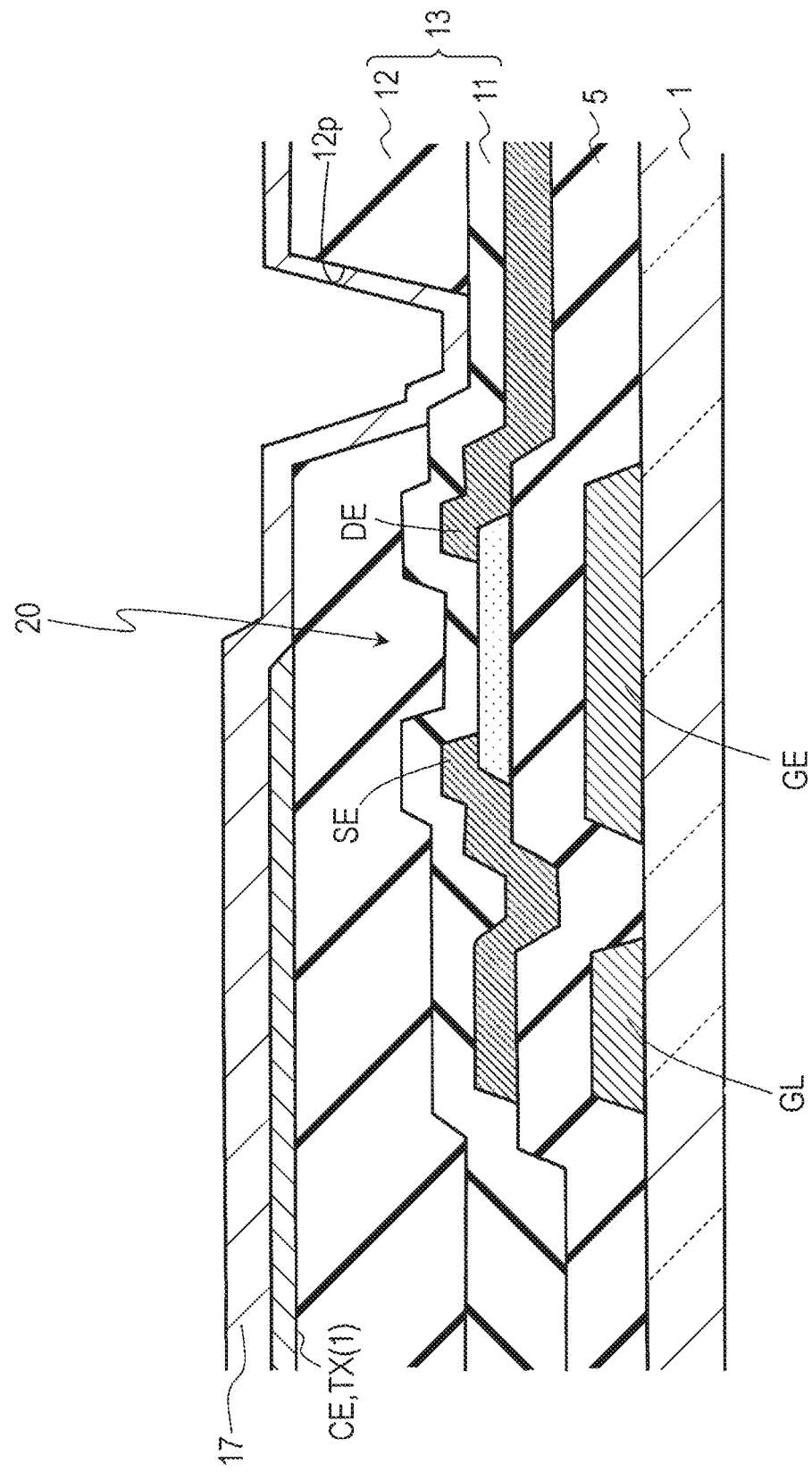
FIG. 11A is a step sectional view illustrating a method for manufacturing the active matrix substrate.

After forming the common electrode CE, as illustrated in FIG. 11A, the first dielectric layer 17 is formed on the common electrode CE and the interlayer insulating layer 13 and in the opening portion 12p. In this modification example, the first dielectric layer 17 is not etched in this step.

STEP 8-2: Formation of Pixel Electrode PE (FIG. 11B)

Subsequently, after forming a second transparent conductive film (not illustrated) on the first dielectric layer 17, patterning of the second transparent conductive film (for example, wet etching using an oxalic acid-based etching solution) is performed. As a result, the pixel electrode PE is formed in each of the pixel regions PIX as illustrated in FIG. 11B. In each of the pixel electrodes PE, in addition to the slits 19s or notched portions disposed in the pixel opening region, the second opening portion 19p (or notched portion) exposing the first dielectric layer 17 is formed in a region where the pixel contact portion is formed (pixel contact portion formation region). In this example, when viewed from the normal direction of the substrate 1, the opening portion 12p of the organic insulating layer 12 is formed so as to overlap the drain electrode DE, and the second opening portion 19p of the pixel electrode PE is located so as to at least partially overlap the bottom surface of the opening portion 12p of the organic insulating layer 12. In this example, the second opening portion 19p partially overlaps the opening portion 12p when viewed in the normal direction of the substrate 1, and the second opening portion 19p may be located inside the opening portion 12p, or the opening portion 12p may be located inside the second opening portion 19p.

As illustrated, a portion of the pixel electrode PE may be located inside the opening portion 12p. Specifically, inside the opening portion 12p, the pixel electrode PE may be disposed on at least a portion of the side surface of the second opening portion 19p via the first dielectric layer 17.

STEP 9-2: Formation of Second Dielectric Layer 18 (FIG. 11C)

Figure 11C:
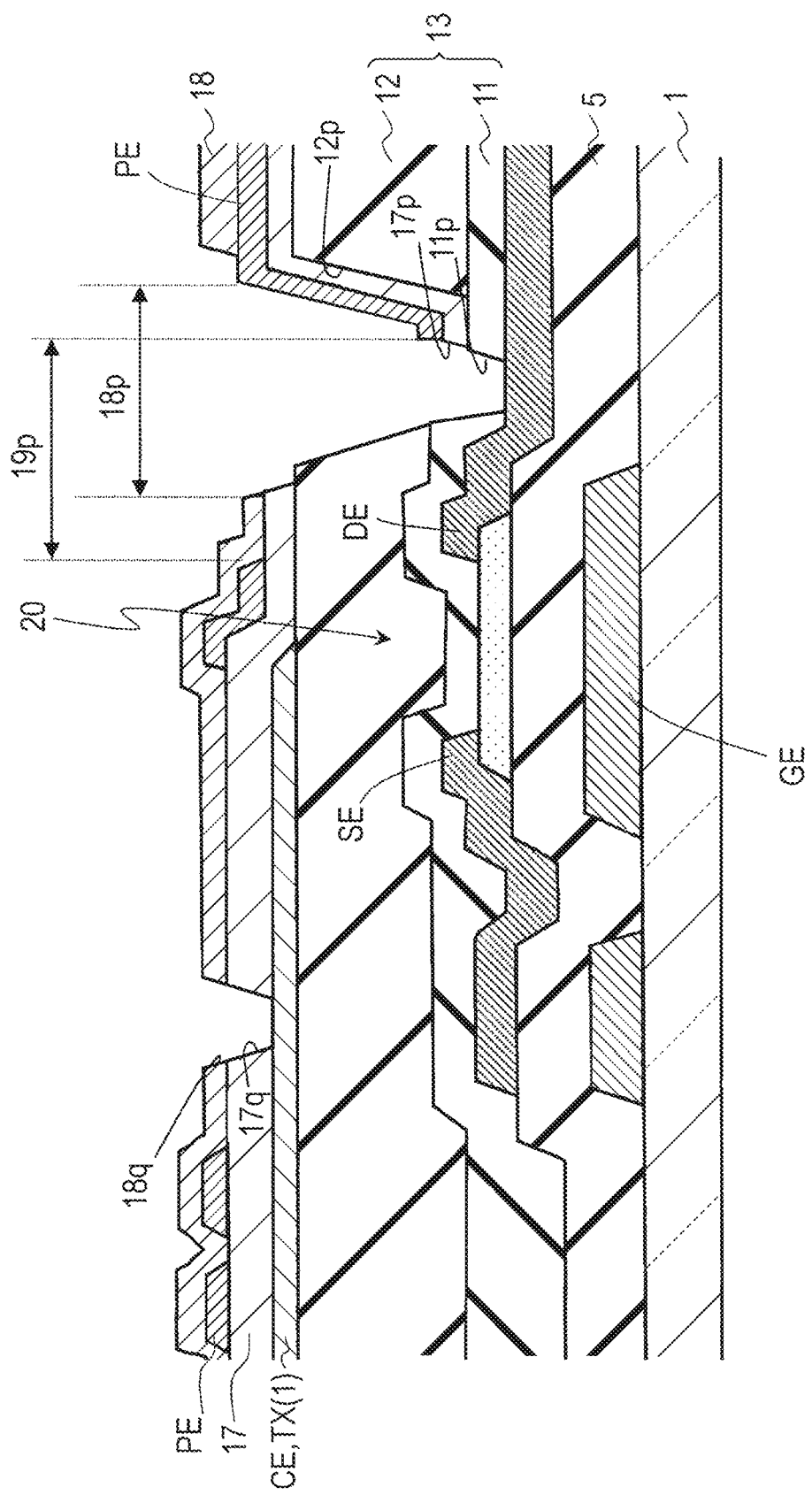
FIG. 11C is a step sectional view illustrating the method for manufacturing the active matrix substrate.

Next, as illustrated in FIG. 11C, the second dielectric layer 18 is formed so as to cover the first dielectric layer 17 and the pixel electrode PE.

Thereafter, a resist layer (not illustrated) is formed on the second dielectric layer 18 by a photolithography step, and the second dielectric layer 18, the first dielectric layer 17 and the inorganic insulating layer 11 are patterned (for example, dry etching). The second dielectric layer 18, the first dielectric layer 17, and the inorganic insulating layer 11 may be etched in the same etching step. As a result, a pixel contact hole exposing a portion of the drain electrode DE is formed in the pixel contact portion formation region, and a sensor contact hole exposing a portion of the touch sensor electrode TX is formed in a region where the touch wiring contact portion is formed (touch wiring contact portion formation region). For example, the pixel contact hole includes the third opening portion 18p formed in the second dielectric layer 18 in this step, the second opening portion (or notched portion) 19p formed in the pixel electrode PE, the opening portion 12p formed in the organic insulating layer 12, and the opening portions 17p and 11p formed in the first dielectric layer 17 and the inorganic insulating layer 11 in this step. The sensor contact hole includes the opening portions 17q and 18q formed in the first dielectric layer 17 and the second dielectric layer 18, respectively, in this step.

In this etching step, the second dielectric layer 18 is etched by using the resist layer as a mask to form the third opening portion 18p configuring the pixel contact hole and the opening portion 18q configuring the sensor contact hole. The third opening portion 18p is disposed so as to partially overlap the second opening portion 19p of the pixel electrode PE and at least partially overlap the opening portion 12p when viewed from the normal direction of the substrate 1. A portion of the pixel electrode PE is exposed in the third opening portion 18p.

The first dielectric layer 17 is etched using the resist layer and the pixel electrode PE as a mask to form the opening portion 17p configuring the pixel contact hole and the opening portion 17q configuring the sensor contact hole. In the pixel contact hole, the side surface of the opening portion 17p may be at least partially aligned with the side surface of the second opening portion 19p of the pixel electrode PE or the side surface of the third opening portion 18p of the second dielectric layer 18. In the sensor contact hole, the side surfaces of the opening portion 17q and the opening portion 18q may be aligned with each other.

The inorganic insulating layer 11 is etched using the resist layer, the pixel electrode PE, and the organic insulating layer 12 as a mask to form the opening portion 11p configuring the pixel contact hole. The side surface of the opening portion 11p may be at least partially aligned with the side surface of the opening portion 12p, the side surface of the second opening portion 19p, or the side surface of the third opening portion 18p.

The inorganic insulating layer 11 may be etched by using the organic insulating layer 12 as a mask after forming the organic insulating layer 12 having the opening portion 12p and before forming the first dielectric layer 17.

STEP 10-2: Formation of Touch Wiring Layer (FIG. 11D)

Figure 11D:
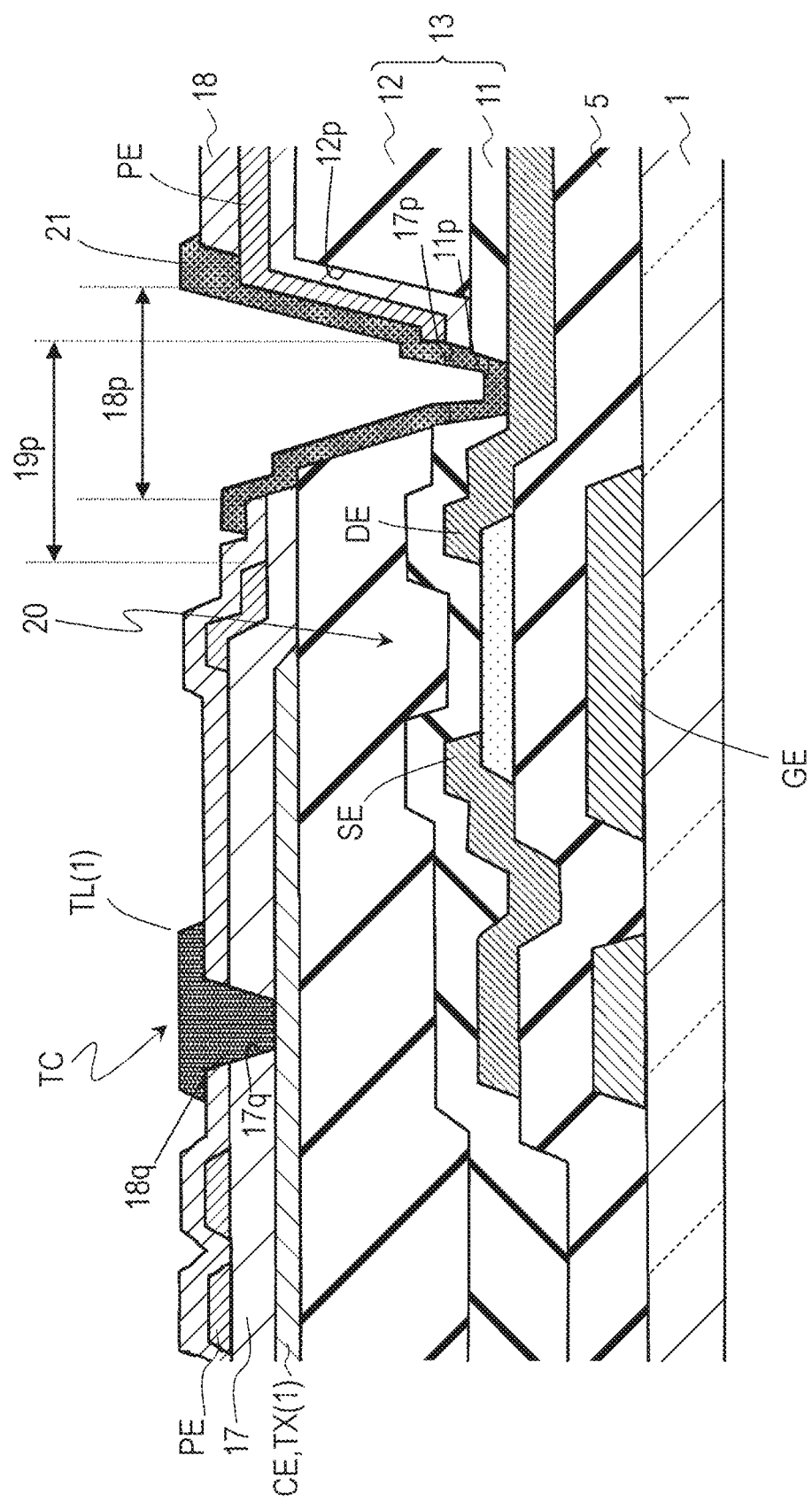
FIG. 11D is a step sectional view illustrating the method for manufacturing the active matrix substrate.

Subsequently, as illustrated in FIG. 11D, a conductive film for touch wiring is formed on the second dielectric layer 18 and in the pixel contact holes, and is patterned to form a touch wiring layer including the touch wiring TL and the connection electrode 21. The touch wiring TL is disposed on the second dielectric layer 18 and in a sensor contact hole (not illustrated), and is electrically connected to the touch sensor electrode TX in the sensor contact hole (directly contacted in this example). The connection electrode 21 is disposed on the second dielectric layer 18 and in the pixel contact hole, and is electrically connected to the first portion of the drain electrode DE and the exposed portion of the pixel electrode PE (portion of the pixel electrode PE exposed by the third opening portion 18p) in the pixel contact hole (directly contacted in this example).

STEP 11: Formation of First Alignment Film AF1

Thereafter, although not illustrated, a first alignment film AF1 (for example, polyimide film) is formed so as to cover the second dielectric layer 18, the touch wiring TL, and the connection electrode 21. As described above, the active matrix substrate 104 can be manufactured.

According to the above method, in STEP 9-2, the inorganic insulating layer 11, the first dielectric layer 17, and the second dielectric layer 18 are simultaneously etched to form pixel contact holes and sensor contact holes. Therefore, it is dispensed with to separately perform the patterning step of forming the opening portion 17p in the first dielectric layer 17. Therefore, the number of photomasks can be reduced as compared with the method for manufacturing the active matrix substrate 101 described with reference to FIGS. 7A to 7F.

Touch Wiring Reconnection Portion

The touch wiring TL may be connected to a connection wiring in another wiring layer (for example, a gate metal layer including the gate bus line GL, a source metal layer including the source bus line SL, and a transparent conductive layer including the common electrode CE). In the present specification, the reconnection portion between the touch wiring TL and the connection wiring is referred to as a "touch wiring reconnection portion". The connection wiring is connected to the touch drive portion TD in the non-display region.

Since the touch wiring TL is not covered with a protection film (inorganic insulating film), in a case where the touch wiring TL is formed of a metal film, when the touch wiring TL is extended to the non-display region (outside the sealing material), corrosion may occur on the surface of the touch wiring TL. On the other hand, when the touch wiring reconnection portion is provided, the touch wiring TL can be electrically connected to the touch drive portion TD via the connection wiring while suppressing corrosion of the touch wiring TL.

Figure 13A:
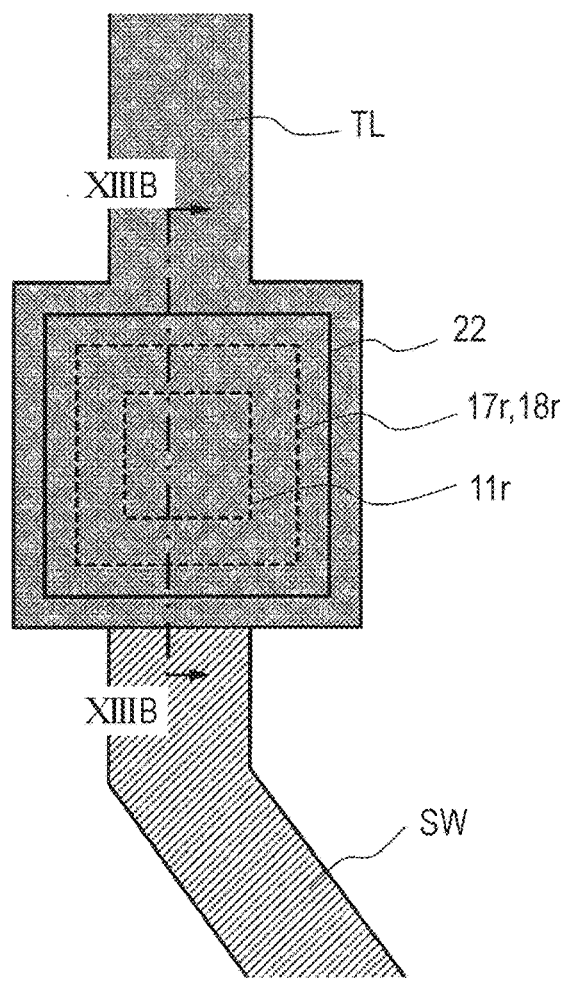
FIG. 13A is a plan view illustrating a touch wiring reconnection portion.
Figure 13B:
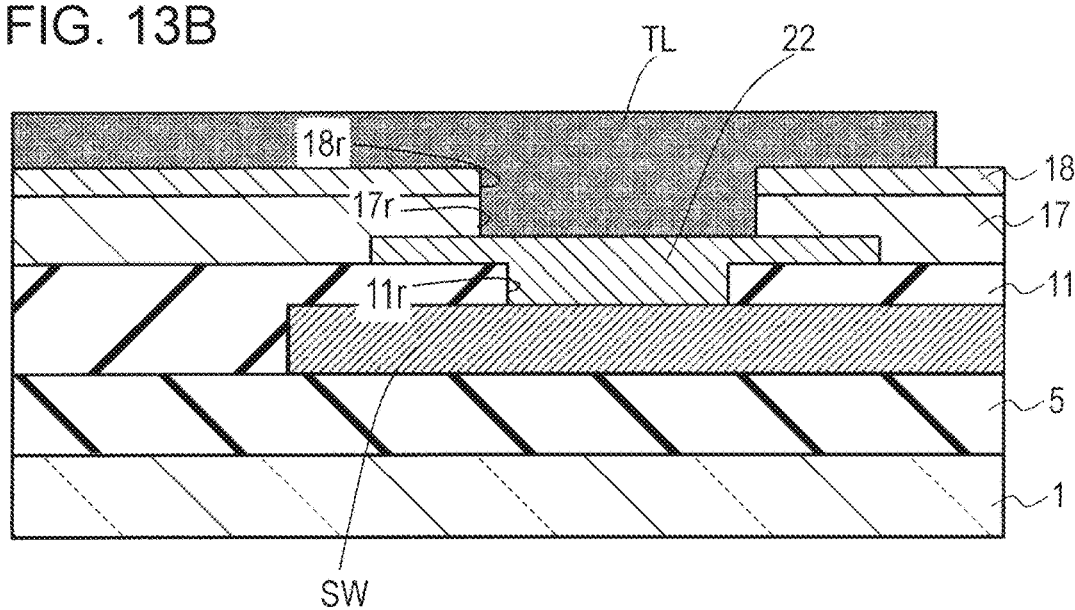
FIG. 13B is a cross-sectional view taken along line XIIIB-XIIIB illustrated in FIG. 13A in the touch wiring reconnection portion.

FIGS. 13A and 13B are a plan view and a cross-sectional view illustrating the touch wiring reconnection portion.

In each of the touch wiring reconnection portions, the end portion of the touch wiring TL is electrically connected to the connection wiring SW via the transparent electrode 22. Specifically, the touch wiring TL is in contact with the transparent electrode 22 in the opening portions 17r and 18r formed in the first dielectric layer 17 and the second dielectric layer 18. The transparent electrode 22 may be an island-shaped electrode formed by using the same transparent conductive film as the common electrode CE. The transparent electrode 22 is in electrical contact with the connection wiring SW formed in the source metal layer in the opening portion 11r formed in the inorganic insulating layer 11. The organic insulating layer 12 may not be formed in the touch wiring reconnection portion. The connection wiring SW extends in the non-display region and is connected to a terminal of the touch drive portion TD (not illustrated).

For example, the illustrated touch wiring reconnection portion can be formed by forming the common electrode CE and the transparent electrode 22, forming the first dielectric layer 17 and the second dielectric layer 18, and patterning after forming the opening portion 11r in the inorganic insulating layer 11.

Figure 14A:
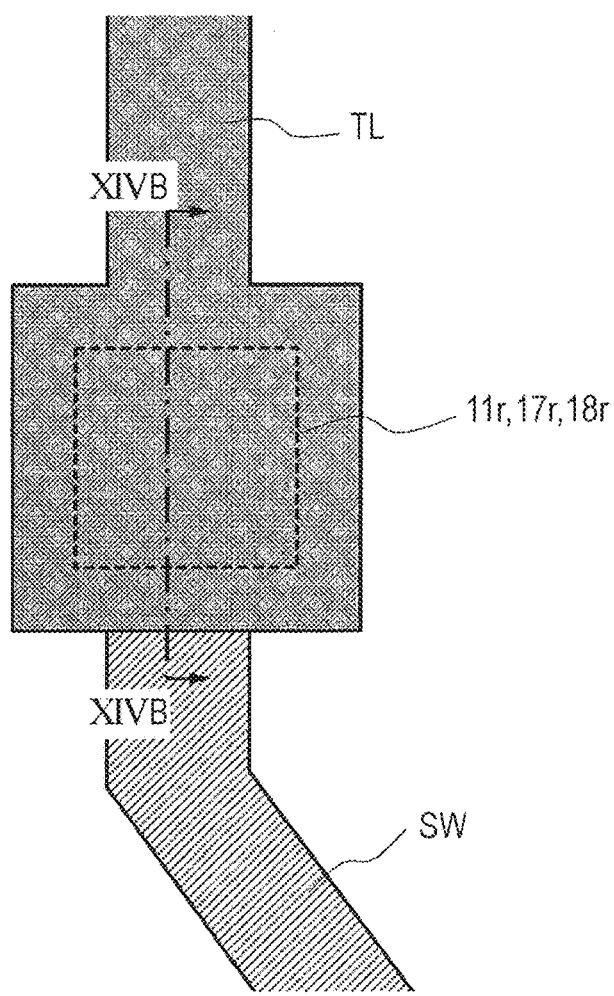
FIG. 14A is a plan view illustrating another example of the touch wiring reconnection portion.
Figure 14B:
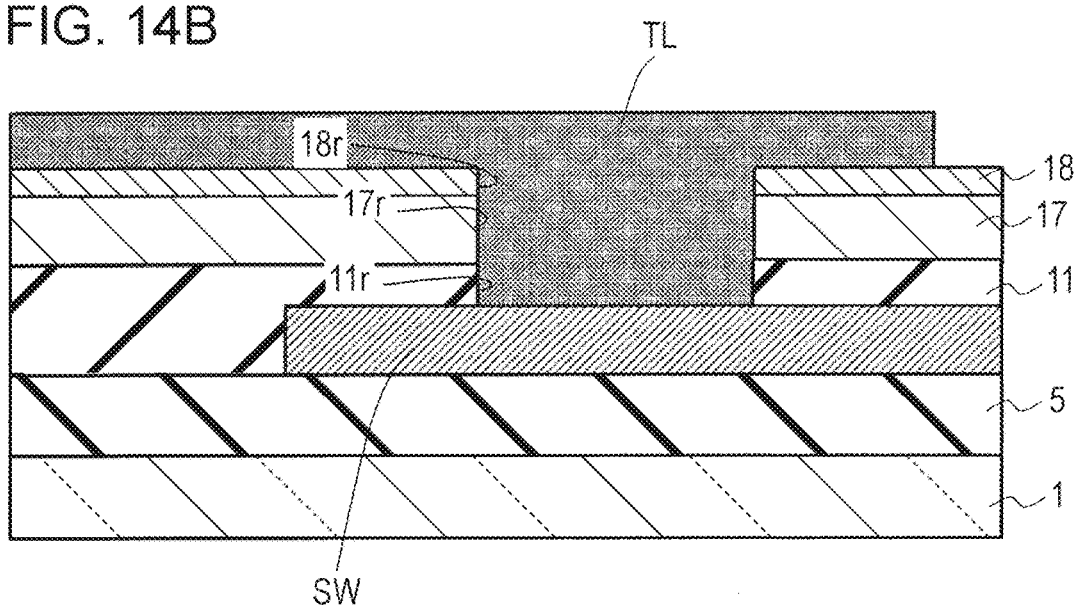
FIG. 14B is a cross-sectional view taken along line XIVB-XIVB illustrated in FIG. 14A in the touch wiring reconnection portion.

Alternatively, as illustrated in FIGS. 14A and 14B, the touch wiring TL may be in direct contact with the connection wiring SW in the opening portions 11r, 17r, and 18r formed in the inorganic insulating layer 11, the first dielectric layer 17, and the second dielectric layer 18. Such a touch wiring reconnection portion can be formed by a process of simultaneously etching the first dielectric layer 17, the second dielectric layer 18, and the inorganic insulating layer 11 (for example, STEP 9-2 in the manufacturing process of the active matrix substrate 103).

About TFT Structure

In the above embodiments, the oxide semiconductor TFT having the oxide semiconductor layer as the active layer is used as the pixel TFT, and instead, a silicon semiconductor TFT having a crystalline silicon semiconductor layer or an amorphous silicon semiconductor layer as an active layer may be used.

The structure of the pixel TFT is not particularly limited. The pixel TFT may be a bottom gate type in which the gate electrode is disposed on the substrate side of the semiconductor layer, or may be a top gate type in which the gate electrode is disposed above the semiconductor layer. Furthermore, the pixel TFT may be a double gate type in which the gate electrode is disposed on the substrate side and above the semiconductor layer, respectively.

The bottom gate type TFT may have, for example, the illustrated channel etch structure. Alternatively, the bottom gate type TFT may have an etch stop structure having a channel protective layer (etch stop layer) between the source and drain electrodes and the oxide semiconductor layer. In a TFT having the etch stop structure, the lower surfaces of the channel-side end portions of the source and drain electrodes are located, for example, on the etch stop layer. For example, the etch stop type TFT is formed by forming conductive films for source and drain electrodes on the oxide semiconductor layer and the etch stop layer, and performing source and drain separation, after forming the etch stop layer covering a portion of the oxide semiconductor layer to be a channel region.

About Oxide Semiconductor

The oxide semiconductor included in the oxide semiconductor layer 7 may be an amorphous oxide semiconductor or a crystalline oxide semiconductor having a crystalline portion. Examples of the crystalline oxide semiconductor include a polycrystalline oxide semiconductor, a microcrystalline oxide semiconductor, and a crystalline oxide semiconductor in which a c-axis is substantially perpendicular to a layer surface.

The oxide semiconductor layer 7 may have a laminated structure of two or more layers. In the case where the oxide semiconductor layer 7 has a laminated structure, the oxide semiconductor layer 7 may include an amorphous oxide semiconductor layer and a crystalline oxide semiconductor layer. Alternatively, a plurality of crystalline oxide semiconductor layers having different crystal structures may be included. A plurality of amorphous oxide semiconductor layers may be included. In a case where the oxide semiconductor layer 7 has a two-layer structure including an upper layer and a lower layer, an energy gap of the oxide semiconductor contained in the upper layer is desirably larger than an energy gap of the oxide semiconductor contained in the lower layer. However, in a case where the difference in energy gap between these layers is relatively small, the energy gap of the oxide semiconductor in the lower layer may be larger than the energy gap of the oxide semiconductor in the upper layer.

Materials, structures, film formation methods, configurations of oxide semiconductor layers having a laminated structure, and the like of the amorphous oxide semiconductor and each of the above crystalline oxide semiconductors are described in, for example, Japanese Unexamined Patent Application Publication No. 2014-007399. For reference, the entire contents disclosed in Japanese Unexamined Patent Application Publication No. 2014-007399 are incorporated herein.

The oxide semiconductor layer 7 may include, for example, at least one metal element among In, Ga, and Zn. In the present embodiment, the oxide semiconductor layer 7 includes, for example, an In—Ga—Zn—O-based semiconductor (for example, indium gallium zinc oxide). Here, the In—Ga—Zn—O-based semiconductor is a ternary oxide of indium (In), gallium (Ga), and zinc (Zn), a ratio (composition ratio) of In, Ga, and Zn is not particularly limited, and includes, for example, In:Ga:Zn=2:2:1, In:Ga:Zn=1:1:1, In:Ga:Zn=1:1:2, and the like. Such an oxide semiconductor layer 7 can be formed of an oxide semiconductor film including an In—Ga—Zn—O-based semiconductor.

The In—Ga—Zn—O-based semiconductor may be amorphous or crystalline. As the crystalline In—Ga—Zn—O-based semiconductor, a crystalline In—Ga—Zn—O-based semiconductor in which the c-axis is oriented substantially perpendicular to the layer surface is preferable.

The crystal structure of a crystalline In—Ga—Zn—O-based semiconductor is disclosed in, for example, above Japanese Unexamined Patent Application Publication No. 2014-007399, Japanese Unexamined Patent Application Publication No. 2012-134475, and Japanese Unexamined Patent Application Publication No. 2014-209727. For reference, the entire contents disclosed in Japanese Unexamined Patent Application Publication No. 2012-134475 and Japanese Unexamined Patent Application Publication No. 2014-

209727 are incorporated herein. A TFT having an In—Ga—Zn—O-based semiconductor layer has high mobility (more than 20 times that of an a-Si TFT) and low leak current (less than 1/100 that of an a-Si TFT). Therefore, the TFT is suitably used as a driving TFT (for example, TFT included in a drive circuit provided on the same substrate as a display region around a display region including a plurality of pixels) and a pixel TFT (TFT provided in a pixel).

The oxide semiconductor layer 7 may include another oxide semiconductor instead of the In—Ga—Zn—O-based semiconductor. For example, an In—Sn—Zn—O-based semiconductor (for example, $In_2O_3$—$SnO_2$—ZnO; InSnZnO) may be included. The In—Sn—Zn—O-based semiconductor is a ternary oxide of indium (In), tin (Sn), and zinc (Zn). Alternatively, the oxide semiconductor layer 7 may include an In—Al—Zn—O-based semiconductor, an In—Al—Sn—Zn—O-based semiconductor, a Zn—O-based semiconductor, an In—Zn—O-based semiconductor, a Zn—Ti—O-based semiconductor, a Cd—Ge—O-based semiconductor, a Cd—Pb—O-based semiconductor, a CdO (cadmium oxide), Mg—Zn—O-based semiconductor, an In—Ga—Sn—O-based semiconductor, an In—Ga—O-based semiconductor, a Zr—In—Zn—O-based semiconductor, a Hf—In—Zn—O-based semiconductor, an Al—Ga—Zn—O-based semiconductor, a Ga—Zn—O-based semiconductor, an In—Ga—Zn—Sn—O-based semiconductor, and the like.

The embodiments of the present disclosure are widely applied to various display devices provided with a touch sensor, and are particularly desirably applied to a high-definition liquid crystal display device with a touch sensor.

The present disclosure contains subject matter related to that disclosed in U.S. Provisional Patent Application No. 62/925,825 filed in the U.S. Patent Office on Oct. 25, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An active matrix substrate comprising:
   a substrate;
   a plurality of TFTs supported on the substrate;
   an interlayer insulating layer that covers the plurality of TFTs;
   a common electrode disposed on the interlayer insulating layer and divided into a plurality of segments each of which functions as a touch sensor electrode;
   a first dielectric layer that covers the common electrode;
   a plurality of pixel electrodes disposed on the first dielectric layer, each of which is electrically connected to any one of the plurality of TFTs;
   a second dielectric layer that covers the plurality of pixel electrodes;
   a plurality of touch wirings disposed on the second dielectric layer, each of which is electrically connected to any one of the plurality of touch sensor electrodes, wherein
   the common electrode k between the plurality of touch wirings and the substrate, the first dielectric layer is between the plurality of touch wirings and the common electrode, the second dielectric layer is between the first dielectric layer and the plurality of touch wirings, and the plurality of pixel electrodes are between the first dielectric layer and the second dielectric layer,
   each of the pixel electrodes at least partially overlaps the common electrode via the first dielectric layer, to define an auxiliary capacitor which includes each of the pixel electrodes, the common electrode, and the first dielectric layer,
   the plurality of touch sensor electrodes include a first electrode, the plurality of touch wirings include a first wiring electrically connected to the first electrode and a second wiring electrically connected to another electrode other than the first electrode in the plurality of touch sensor electrodes, the second wiring extends to the other electrode across the first electrode when viewed from a normal direction of the substrate, and
   a portion of the second wiring overlaps the first electrode via the first dielectric layer and the second dielectric layer, so that a touch wiring capacitance including the second wiring, the first electrode, the first dielectric layer, and the second dielectric layer is formed.

2. The active matrix substrate according to claim 1, wherein
   the first dielectric layer and the second dielectric layer are formed of the same material.

3. The active matrix substrate according to claim 1, wherein
   a thickness of the second dielectric layer is less than a thickness of the first dielectric layer.

4. The active matrix substrate according to claim 1, wherein
   a thickness of the second dielectric layer is 5 nm or more and 100 nm or less.

5. The active matrix substrate according to claim 1, wherein
   each of the plurality of touch wirings is electrically connected to any one of the touch sensor electrodes in a sensor contact hole formed in the first dielectric layer and the second dielectric layer.

6. The active matrix substrate according to claim 1, further comprising:
   a plurality of connection electrodes formed by using the same conductive film as the plurality of touch wirings and electrically separated from the plurality of touch wirings, wherein
   each of the pixel electrodes is electrically connected to a drain electrode of any one of the TFTs via any one of the plurality of connection electrodes.

7. The active matrix substrate according to claim 6, further comprising:
   a pixel contact hole that includes
      a first opening portion formed in the interlayer insulating layer and the first dielectric layer and exposing a first portion of the drain electrode of any one of the TFTs,
      a second opening portion or a notched portion formed in each of the pixel electrodes, exposing the first portion, and at least partially overlapping the first opening portion when viewed from the normal direction of the substrate, and
      a third opening portion formed in the second dielectric layer and exposing a portion of each of the pixel electrodes and the first portion, wherein
   each of the connection electrodes is connected to the first portion and the portion of each of the pixel electrodes in the pixel contact hole.

8. The active matrix substrate according to claim 7, wherein
a side surface of the first opening portion is at least partially aligned with a side surface of the second opening portion or the notched portion of each pixel electrode.

9. The active matrix substrate according to claim 7, wherein
the side surface of the first opening portion is at least partially aligned with a side surface of the third opening portion of the second dielectric layer.

10. The active matrix substrate according to claim 1, wherein
each of end portions of the plurality of touch wirings is electrically connected to a connection wiring formed of the same conductive film as source electrodes of the plurality of TFTs.

11. The active matrix substrate according to claim 10, wherein
each of the end portions of the plurality of touch wirings is electrically connected to the connection wiring via a transparent electrode formed of the same transparent conductive film as the common electrode.

12. The active matrix substrate according to claim 1, wherein
the plurality of TFTs include an oxide semiconductor layer as an active layer.

13. The active matrix substrate according to claim 12, wherein
the oxide semiconductor layer includes an In—Ga—Zn—O-based semiconductor.

14. A liquid crystal display device with a touch sensor, the device comprising:
the active matrix substrate according to claim 1;
a counter substrate disposed so as to face the active matrix substrate; and
a liquid crystal layer provided between the active matrix substrate and the counter substrate, wherein
the active matrix substrate includes an alignment film disposed on the second dielectric layer, and the alignment film is in contact with the liquid crystal layer.

15. The active matrix substrate according to claim 1, wherein no portion of the second dielectric layer is in the auxiliary capacitor.

* * * * *